United States Patent
Lee et al.

(10) Patent No.: US 9,521,382 B2
(45) Date of Patent: Dec. 13, 2016

(54) DISPLAY APPARATUS CAPABLE OF PROJECTING DIFFERENT IMAGES ON DISPLAY AREAS

(71) Applicant: LG ELECTRONICS INC., Seoul (KR)

(72) Inventors: Jaekwang Lee, Seoul (KR); Sangkeun Lee, Seoul (KR); Chanyoung Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 14/333,111

(22) Filed: Jul. 16, 2014

(65) Prior Publication Data

US 2015/0022783 A1    Jan. 22, 2015

(30) Foreign Application Priority Data

Jul. 16, 2013  (KR) ......................... 10-2013-0083762

(51) Int. Cl.
| | |
|---|---|
| *G03B 21/20* | (2006.01) |
| *H04N 9/31* | (2006.01) |
| *G06F 3/01* | (2006.01) |
| *H04N 13/04* | (2006.01) |
| *G06F 3/14* | (2006.01) |

(Continued)

(52) U.S. Cl.
CPC ........ *H04N 9/3129* (2013.01); *G03B 21/2013* (2013.01); *G03B 21/2033* (2013.01); *G03B 21/28* (2013.01); *G06F 3/017* (2013.01); *G06F 3/1423* (2013.01); *H04N 9/3147* (2013.01);

(Continued)

(58) Field of Classification Search
CPC . G03B 21/2013; G03B 21/2033; G03B 21/28; G03B 33/04; G06F 3/017; G06F 3/1423; H04N 13/0459; H04N 9/3129; H04N 9/3147; H04N 9/3161
See application file for complete search history.

(56) References Cited

U.S. PATENT DOCUMENTS

2006/0214875 A1    9/2006  Sonehara
2007/0195294 A1*   8/2007  Willey ................... G03B 21/26
                                                  353/119

(Continued)

FOREIGN PATENT DOCUMENTS

WO    2012/063703    5/2012

OTHER PUBLICATIONS

European Patent Office Application Serial No. 14177075.0, Search Report dated Mar. 18, 2015, 6 pages.

(Continued)

*Primary Examiner* — Sultan Chowdhury
*Assistant Examiner* — Magda Cruz
(74) *Attorney, Agent, or Firm* — Lee Hong Degerman Kang & Waimey

(57) ABSTRACT

Disclosed is a display apparatus. The display apparatus includes a light source unit configured to output a visible light, a scanner configured to output a first projection image and a second projection image based on the visible light by implementing first direction scanning and second direction scanning, and a light path splitter configured to separate light paths of the first projection image and the second projection image from each other, so as to output the first projection image and the second projection image toward a first display area and a second display area respectively. The display apparatus is capable of projecting different images onto display areas.

17 Claims, 20 Drawing Sheets

(51) Int. Cl.
*G03B 21/28* (2006.01)
*G03B 33/04* (2006.01)

(52) U.S. Cl.
CPC ........ *H04N 9/3161* (2013.01); *H04N 13/0459* (2013.01); *G03B 33/04* (2013.01)

(56) References Cited

U.S. PATENT DOCUMENTS

| | | | |
|---|---|---|---|
| 2008/0055566 A1 | 3/2008 | Yun | |
| 2013/0222771 A1* | 8/2013 | Tsubota | G02B 26/101 |
| | | | 353/20 |
| 2014/0172363 A1* | 6/2014 | Deichmann | G01B 11/2518 |
| | | | 702/166 |

OTHER PUBLICATIONS

European Patent Office Application Serial No. 14177075.0, Search Report dated Jul. 17, 2015, 11 pages.

* cited by examiner

DISPLAY APPARATUS CAPABLE OF PROJECTING DIFFERENT IMAGES ON DISPLAY AREAS

CROSS-REFERENCE TO RELATED APPLICATION

Pursuant to 35 U.S.C. §119(a), this application claims the benefit of earlier filing date and right of priority to Korean Patent Application No. 10-2013-0083762, filed on Jul. 16, 2013, the contents of which are hereby incorporated by reference herein in their entirety.

BACKGROUND OF THE INVENTION

1. Field of the Invention

The present invention relates to a display apparatus, and more particularly to a display apparatus capable of projecting different images on display areas.

2. Description of the Related Art

A display apparatus is an apparatus that displays an image. Among various display apparatuses, a projector is an apparatus that projects an image onto a screen.

Conventional projectors have a function of projecting an image onto a screen in a given direction. Meanwhile, a conventional dual screen projection system is limited in that a single projector displays the same image on each screen.

There is increasing user demand for display of different images on display areas.

SUMMARY OF THE INVENTION

It is an object of the present invention to provide a display apparatus capable of projecting different images on display areas.

In accordance with one aspect of the present invention, the above and other objects can be accomplished by the provision of a display apparatus including a light source unit configured to output a visible light, a scanner configured to output a first projection image and a second projection image based on the visible light by implementing first direction scanning and second direction scanning, and a light path splitter configured to separate light paths of the first projection image and the second projection image from each other, so as to output the first projection image and the second projection image toward a first display area and a second display area respectively.

In accordance with another aspect of the present invention, there is provided a display apparatus including a light source unit configured to output a first projection image and a second projection image based on a visible light, a light path splitter configured to separate light paths of the first projection image and the second projection image from each other, a first scanner configured to output the first projection image having the separated light path toward a first display area by implementing first direction scanning and second direction scanning, and a second scanner configured to output the second projection image having the separated light path toward a second display area by implementing the first direction scanning and the second direction scanning.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the embodiments of the present invention.

With respect to constituent elements used in the following description, suffixes "module" and "unit" are given only in consideration of ease in the preparation of the specification, and do not have or serve as specially important meanings or roles. Thus, the "module" and "unit" may be mingled with each other.

A display apparatus described herein is designed to display projection images on display areas via scanning. More particularly, the display apparatus is capable of recognizing a distance to an external object or motion of the external object while displaying projection images on display areas via scanning.

To this end, the display apparatus may include a light output module to output a projection image. In addition to outputting the projection image, the light output module may output an output light for detection of a distance to an external object or motion of the external object.

In addition, the display apparatus is capable of receiving a light scattered or reflected by an external object and of detecting, e.g., a distance to the external object based on a difference between the output light and the received light. The display apparatus is further capable of outputting a corresponding projection image based on the detected distance to the external object or the detected gesture.

Meanwhile, the display areas may include separate areas in a screen to display projection images. Or the display areas may include separate screens to display projection images. Hereinafter, the display areas will be described in view of separate screens.

Meanwhile, the above described display apparatus may be included in home appliances, such as a mobile terminal, TV, set top box, media player, game console, air conditioner, refrigerator, washing machine, cooking appliance, robot cleaner, etc., and may also be included in a vehicle, such as a car, etc.

Hereinafter, the display apparatus as described above will be described in detail.

Figure 1A:
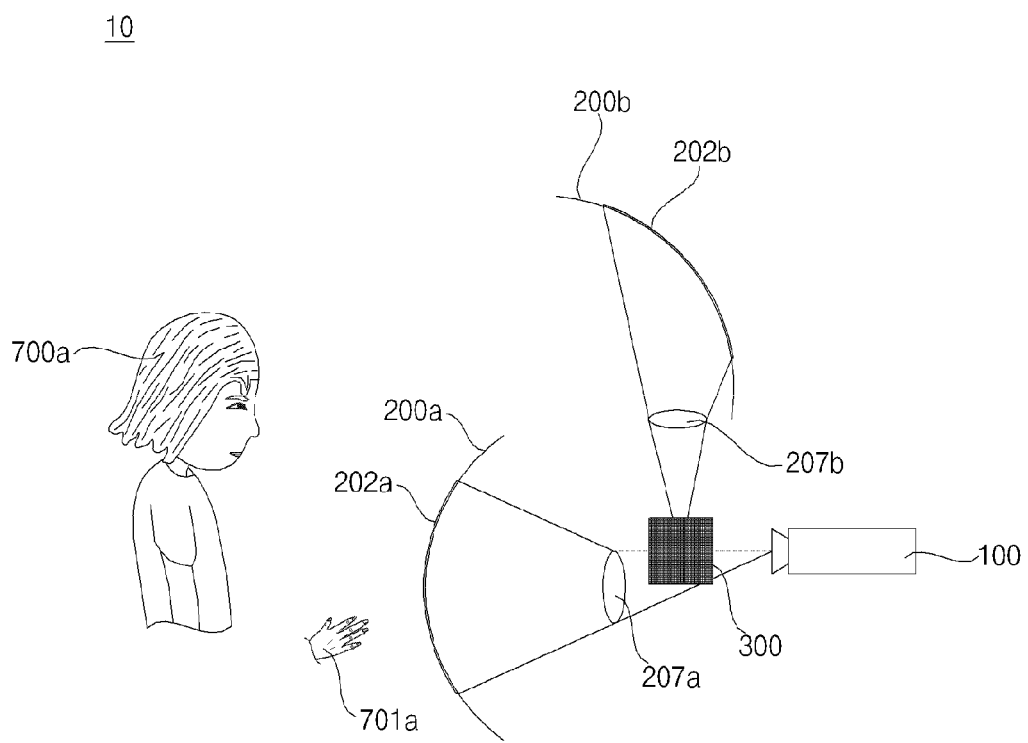
FIG. 1A illustrates a conceptual view of a display apparatus in accordance with one embodiment of the present invention.

FIG. 1A illustrates a conceptual view of a display apparatus in accordance with one embodiment of the present invention.

Referring to the drawing, the display apparatus 10 may include a light output module 100, a light path splitter 300, and screens 200a and 200b.

The light output module 100 may output a projection image based on a visible light, and an output light for detection of a distance to an external object via first direction scanning and second direction scanning. In addition, the light output module 100 may receive a light corresponding to the output light, and detect a distance to an external object or motion of the external object based on a difference between the output light and the received light.

In particular, the light output module 100 may simultaneously output the projection image and the output light via scanning. To this end, the light output module 100 may include a 2-dimensional (2D) scanner.

The light path splitter 300 may split a light path such that some of the projection image and the output light from the light output module 100 is output toward the first screen 200a and the remainder is output toward the second screen 200b.

For example, the light path splitter 300 may include a mirror to reflect incident light, a half mirror (or beam splitter) to reflect a portion of incident light and transmit the remaining portion, and a polarized beam splitter to transmit a first polarized light of incident light and reflect a second polarized light of the incident light.

Through provision of the light path splitter 300, some of the projection image and the output light may be output to the first screen 200a and the remainder of the projection image and the output light may be output to the second screen 200b.

A first lens 207a may be located between the light path splitter 300 and the first screen 200a to expand the projection image and the output light, and a second lens 207b may be located between the light path splitter 300 and the second screen 200b to expand the projection image and the output light.

As a result of the light path splitter 300 splitting a light path into two, a first projection image 202a may be displayed on the first screen 200a, and a second projection image 202b may be displayed on the second screen 200b.

In this way, projection images may be simply displayed on two screens arranged in different directions using the single light output module 100 and the light path splitter 300.

Accordingly, as exemplarily shown in the drawing, a first user 700a, who is located at the front of the first screen 200a and the second screen 200b, may recognize the first projection image 202a projected in a rear projection manner and the second projection image 202b projected in a front projection manner.

Meanwhile, when the first user 700a makes a prescribed gesture, more particularly, when the first user 700a makes a gesture using a hand 701a, the output light, output along with the projection image, may be scattered or reflected by the hand 701a of the first user 700a, and in turn a scattered or reflected light may be transmitted to the light output module 100.

In this case, the light output module 100 may detect a distance to the hand 701a of the first user 700a based on a difference between the output light and the received light, and moreover may sense a gesture based on motion of the hand 701a.

In conclusion, the above described display apparatus 10 enables not only display of different projection images on two screens, but also detection of a distance to an external object or recognition of a gesture.

Meanwhile, the conceptual view of the display apparatus of FIG. 1A may be applied to the interior of a vehicle. For example, the first screen 200a may correspond to a center fascia, and the second screen 200b may correspond to a vehicle windshield. In particular, the second screen 200b may function as a head-up display.

Figure 1B:
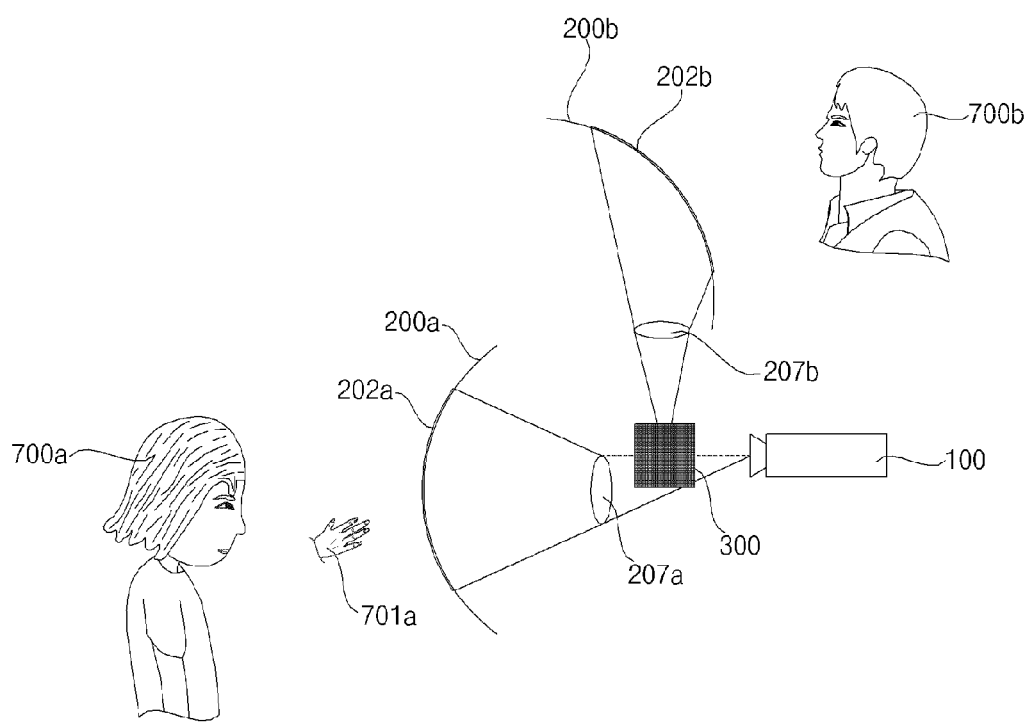
FIG. 1B illustrates a conceptual view of a display apparatus in accordance with another embodiment of the present invention.

Next, FIG. 1B illustrates a conceptual view of a display apparatus in accordance with another embodiment of the present invention.

Although similar to the conceptual view of FIG. 1A, the conceptual view of FIG. 1B has a difference in that a second user 700b is located not at the front of the second screen 200b, but at the rear of the second screen 200b.

More specifically, as exemplarily shown in the drawing, the first user 700a, who is located at the front of the first screen 200a, may recognize the first projection image 202a projected in a rear projection manner, and the second user 700b, who is located at the rear of the second screen 200b, may recognize the second projection image 202b projected in a rear projection manner.

In conclusion, the above described display apparatus 10 enables not only display of different projection images on two screens, but also detection of a distance to an external object or recognition of a gesture.

Figure 2:
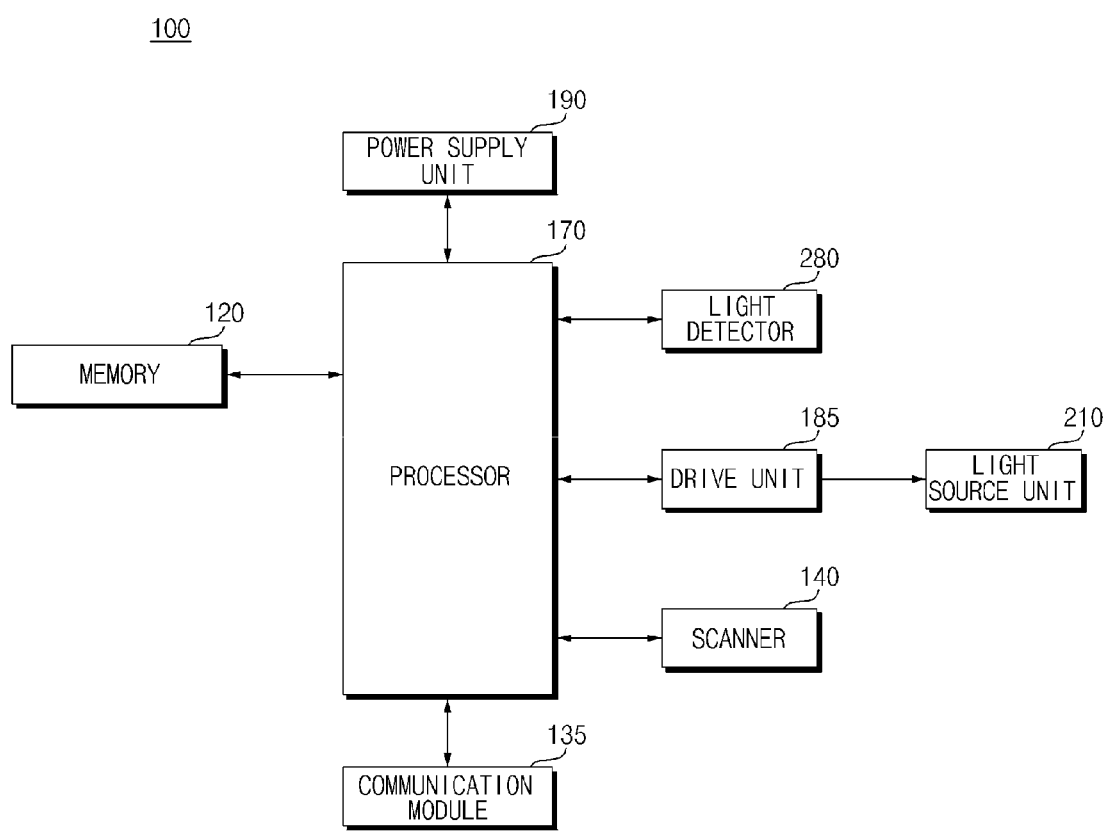
FIG. 2 is a block diagram showing a simplified internal configuration of the display apparatus of FIG. 1.

FIG. 2 is a block diagram showing a simplified internal configuration of the display apparatus of FIG. 1.

Referring to the drawing, the light output module 100 serves to output a projection image and an output light in a Time of Flight (TOF) manner.

To this end, the light output module 100 may include a memory 120, a scanner 140, a processor 170, a communication module 135, a drive unit 185, a power supply unit 190, a light source unit 210, and a light detector 280, for example.

The memory 120 may store programs for processing and control of the processor 170, and may function to temporarily store input or output data (e.g., still images and videos).

The communication module 135 serves as an interface between the light output module 100 and all external devices connected to the light output module 100 in a wired or wireless manner. The communication module 135 may receive data or power from the external devices to transmit the same to internal components of the light output module 100, and may transmit internal data of the light output module 100 to the external devices.

In particular, the communication module 135 may receive a radio signal from a proximate mobile terminal (not shown). Here, the radio signal may include a voice call signal, a video telephony call signal, or various types of data, such as text data, image data, etc.

To this end, the communication module 135 may include a local area communication module (not shown). Local area communication technologies may include Bluetooth, Radio Frequency Identification (RFID), Infrared Data Association (IrDA), Ultra Wideband (UWB), ZigBee, Near Field Communication (NFC), and the like.

The scanner 140 may output an input light to an external area by sequentially and repeatedly implementing first direction scanning and second direction scanning.

The light, input to the scanner 140, may include a visible light corresponding to a projection image and an output light for detection of a distance to an external object. Here, the output light may be an infrared light.

The scanner 140 may sequentially and repeatedly implement scanning from the left to the right and scanning from the right to the left with respect to an external scan area, and more particularly may implement this scanning with respect to the entire external scan area on a per frame basis. Through the scanning as described above, the scanner 140 may output the visible light and the output light to the external scan area.

The processor 170 may implement general control operation of the light output module 100. More specifically, the processor 170 may control operation of the respective internal units of the light output module 100.

The processor 170 may control output of a projection image, such as a video image stored in the memory 120 or a video image transmitted from an external device through the communication module 135, to an external scan area.

To this end, the processor 170 may control the drive unit 185 that controls the light source unit 210 to output red (R), green (G), and blue (B) visible lights. More specifically, the processor 170 may output R, G and B signals, corresponding to a video image to be displayed, to the drive unit 185.

Meanwhile, the processor 170 may transmit an electrical signal, corresponding to an output light, to the drive unit 185, for detection of a distance to an external object.

The processor 170 may control operation of the scanner 140. More specifically, the processor 170 may control sequential and repetitive implementation of first direction scanning and second direction scanning for output of a light.

Meanwhile, during control of operation of the scanner 140, the processor 170 may vary a frame rate to vary a scan area of the scanner 140 or may vary scanning resolution in a given scan area.

For example, when the processor 170 operates the scanner 140 at a frame rate of 60 Hz and then operates the scanner 140 at a frame rate of 30 Hz, a scan area of the scanner 140 may be doubled, or scanning resolution may be doubled under the condition of a fixed scan area.

In the embodiment of the present invention, based on the above described property, a display operation is controlled such that multiple screens, for example, two screens output corresponding images respectively. This will be described with reference to FIG. 6E and the following drawings.

Meanwhile, the processor 170 may implement detection of a distance to an external object based on an electrical signal, corresponding to an output light to be transmitted to the drive unit 185, and an electrical signal corresponding to a received light detected by the light detector 280.

For example, the processor 170 may detect a distance to an external scan area using a phase difference between an electrical signal corresponding to an output light and an electric signal corresponding to a received light. In addition, the processor 170 may detect gesture motion of a user based on distance information regarding an external scan area detected on a per frame basis.

The light source unit 210 may include a blue light source to output a blue light, a green light source to output a green light, and a red light source to output a red light. In this case, each light source may take form of a laser diode or Light Emitting Diode (LED).

In addition, the light source unit 210 may include an infrared light source to output an infrared light.

The light detector 280 may detect a received light from an external object, the received light corresponding to an output light, and convert the detected received light into an electrical signal. To this end, the light detector 280 may include a photodiode to convert an optical signal into an electrical signal. In particular, the light detector 280 may include a photodiode having high photoelectric conversion efficiency, for example, an avalanche photodiode to convert a light, scattered by an external object, into an electrical signal.

Meanwhile, when an output light is an infrared light, the light detector 280 may include a Charge Coupled Device (CCD) or a Complementary Metal Oxide Semiconductor (CMOS) sensor, in order to receive and detect the infrared light.

Although not shown in the drawing, a sampler (not shown) to convert an analog signal into a digital signal may be additionally provided between the light detector 280 and the processor 170.

The drive unit 185 may control output of red, green, and blue lights from the red light source, the green light source, and the blue light source of the light source unit 210 in response to R, G, and B signals transmitted from the processor 170.

Meanwhile, the drive unit 185 may control output of an infrared light from the infrared light source of the light source unit 210 in response to an electrical signal, corresponding to an output light, transmitted from the processor 170.

The power supply unit 190 may supply power required for operation of the respective components upon receiving external power or internal power under control of the processor 170.

Figure 3:
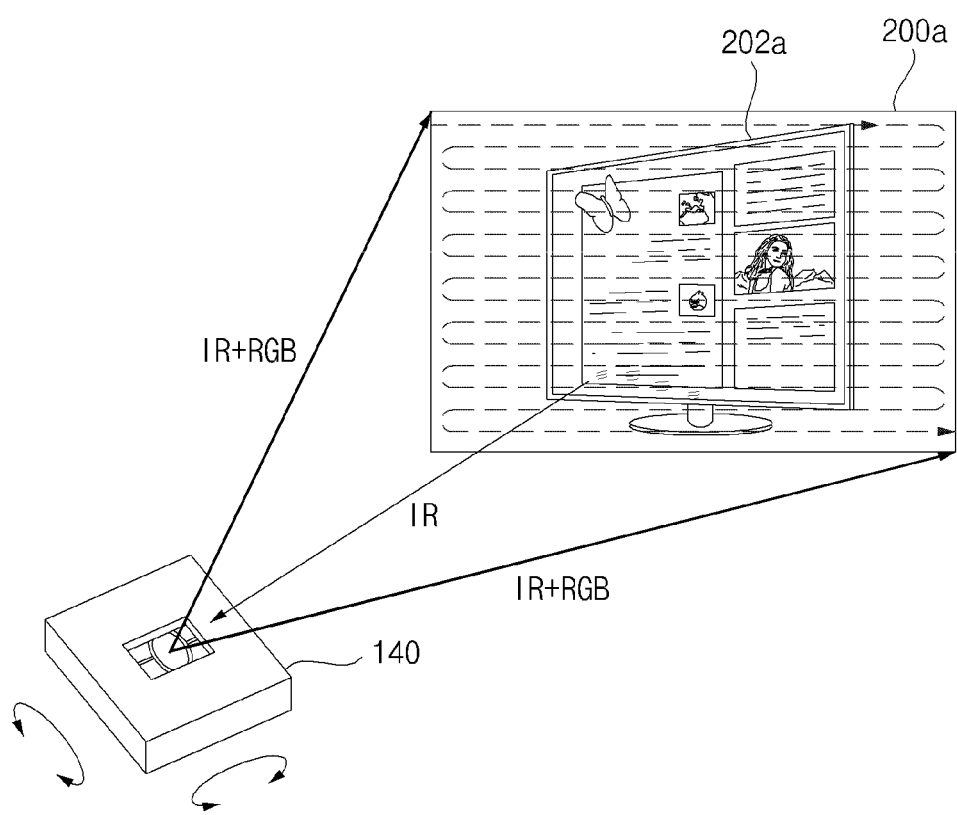
FIG. 3 illustrates simultaneous output of a projection image and a light for distance detection from a light output module of FIG. 1.

FIG. 3 illustrates simultaneous output of a projection image and an output light for distance detection from the light output module of FIG. 1.

Referring to the drawing, the scanner 140 included in the light output module 100 in accordance with the embodiment of the present invention may output an input light to an external scan area by sequentially and repeatedly implementing first direction scanning and second direction scanning. The drawing illustrates output of the projection image 202*a*; RGB and an output light IR to the first screen 200*a* among the first screen 200*a* and the second screen 200*b* of FIG. 1.

The scanner 140 included in the light output module 100 in accordance with the embodiment of the present invention may simultaneously output an input light, i.e. a visible light RGB and an infrared output light IR. In particular, the scanner 140 may sequentially and repeatedly implement scanning from the left to the right and scanning from the right to the left with respect to an external scan area, and more particularly may implement this scanning with respect to the entire scan area on a per frame basis.

More specifically, the light output module 100 in accordance with the embodiment of the present invention may detect a distance to an external object while projecting an image to an external area. Therefore, the light output module 100 enables display of an image related to the distance to the object or motion of the object, or display of an image corresponding to a user gesture.

Although not shown in the drawing, the scanner 140 included in the light output module 100 in accordance with the embodiment of the present invention may output the projection image 202b (RGB) and the output light (IR) on the second screen 200b.

In this case, the projection images 202a and 202b, displayed on the first screen 200a and the second screen 200b respectively, may be different images or the same image based on properties of the light path splitter 300 of FIG. 1. This will be described below in different embodiments.

Hereinafter, the internal configuration of the light output module 100 will be described in more detail.

Figure 4:
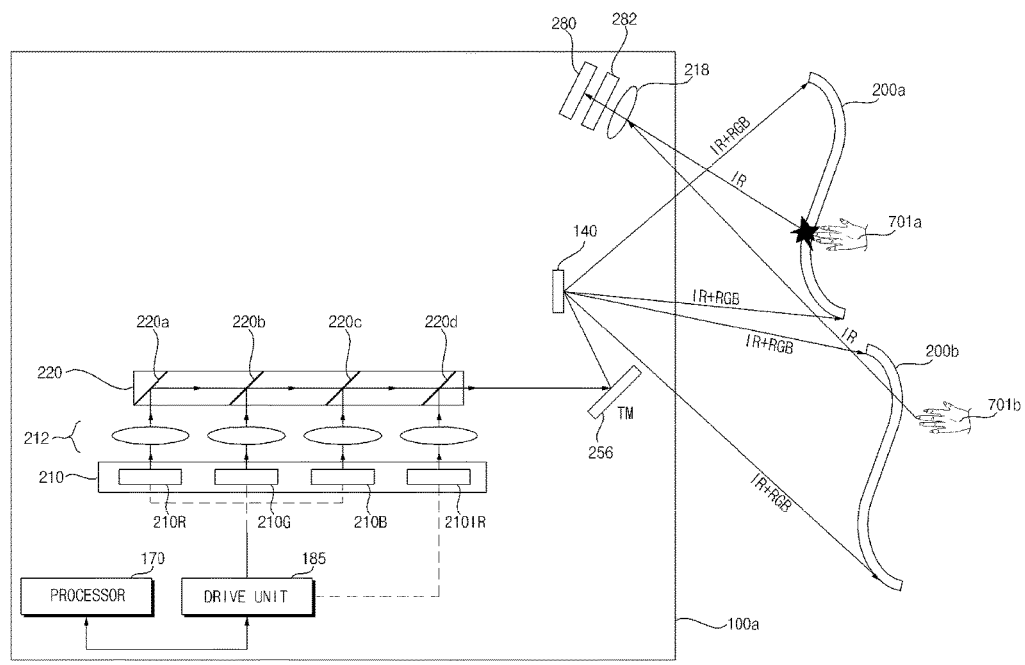
FIG. 4 illustrates one example of a light output module of FIG. 1.

FIG. 4 illustrates one example of the light output module of FIG. 1.

Referring to the drawing, a light output module 100a of FIG. 4 may include the light source unit 210 including a plurality of light sources. More specifically, the light source unit 210 may include a red light source 210R, a green light source 210G, a blue light source 210B, and an output light source 210IR to output an infrared output light.

The respective light sources 210R, 210G, 210B and 210IR may be driven by respective electrical signals from the drive unit 185, and the electrical signals of the drive unit 185 may be generated under control of the processor 170. Meanwhile, the output light source 210R may output an output light in response to an electrical signal corresponding to the output light.

Lights, output from the respective light sources 210R, 210G, 210B and 210IR, are collimated via respective collimator lenses included in a collimator unit 212.

A photosynthesis unit 220 synthesizes lights output from the respective light sources 210R, 210G, 210B and 210IR, and outputs the synthesized light in a given direction. To this end, the photosynthesis unit 220 may include four 2D Micro Electro Mechanical System (MEMS) mirrors 220a, 220b, 220c, and 220d.

More specifically, a first photo synthesizer 220a, a second photo synthesizer 220b, a third photo synthesizer 220c, and a fourth photo synthesizer 220d respectively output a red light from the red light source 210R, a green light from the green light source 210G, a blue light from the blue light source 210B, and an output light from the output light source 210IR toward the scanner 140.

A light reflector 256 reflects the red light, the green light, the blue light, and the output light, having passed through the photosynthesis unit 220, toward the scanner 140. The light reflector 256 must reflect lights of various wavelengths, and to this end may take the form of a Total Mirror (TM).

Meanwhile, the scanner 140 may output a visible light RBG and an output light IR, received from the light source unit 210 by sequentially and repeatedly implementing first direction scanning and second direction scanning with respect to an external area. This scanning is repeatedly implemented with respect to the entire external scan area.

In particular, the visible light RGB and the output light IR, output from the scanner 140, may be separated from each other by the light path splitter 300 of FIG. 1 to thereby be output to the first screen 200a and the second screen 200b.

Thereby, a first projection image corresponding to the visible light RGB may be displayed on the first screen 200a and a second projection image corresponding to the visible light RGB may be displayed on the second screen 200b. Here, the first projection image and the second projection image may be different images, or may be the same image.

Meanwhile, since a user, who is located opposite to the light output module 100, recognizes the projection images displayed respectively on the first screen 200a and the second screen 200b, this image projection may be referred to as rear projection.

In addition, with regard to a user who is located at the front of the first screen 200a or a user who is located at the front of the second screen 200b, detection of a distance to each user is possible based on an output light to be output to the first screen 200a or the second screen 200b.

For example, as exemplarily shown in the drawing, when the user who is located at the front of the first screen 200a implements a touch input of touching the first screen 200a using the hand 701a, the light output module 100a may receive a light corresponding to the user hand 701a, and sense the touch input based on the output light and the received light.

In addition, as exemplarily shown in the drawing, when the user who is located at the front of the second screen 200b implements a gesture input at the front of the second screen 200b using the hand 701b, the light output module 100a may receive a light corresponding to the user hand 701b, and sense the gesture input based on the received light as well as the output light.

A received light, acquired after scattering or reflection of the output light as described above, may be input to the light detector 280 through the collimator unit 218 and an infrared light transmission filter 282.

The light detector 280 may detect a received light from the external object, the received light corresponding to the output light, and convert the detected received light into an electrical signal.

Then, the processor 170 may sense the aforementioned touch input or gesture input based on an electrical signal corresponding to the output light and an electrical signal corresponding to the received light.

Meanwhile, according to the embodiment of the present invention, the scanner 140 outputs the visible light RGB, and therefore the first screen 200a and the second screen 200b, which display projection images, may have freeform curved surfaces. Even in this case, the projection image may be displayed on the curved surface of the corresponding screen. For example, the curvature of the first screen 200a and the second screen 200b may be recognized via distance detection using the output light, scaling of a display image is implemented based on the corresponding curved surface, and the scaled projection image may be displayed. In this way, display on a freeform curved surface is possible.

Figure 5:
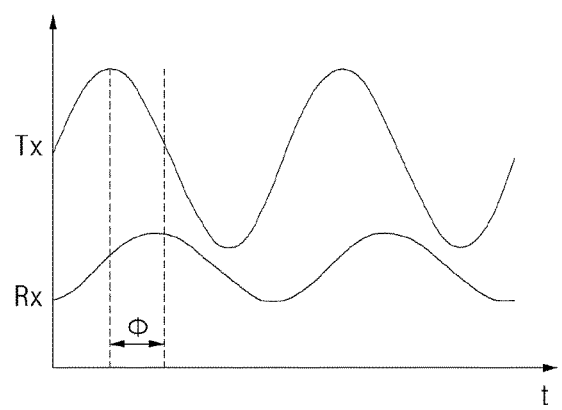
FIG. 5 is a reference view for explanation of a distance detection method of the light output module of FIG. 4.

FIG. 5 is a reference view for explanation of a distance detection method of the light output module of FIG. 4.

Referring to the drawing, sensing of the touch input on the first screen of FIG. 4 or sensing of the gesture input implemented at the front of the second screen of FIG. 4 may be implemented based on a phase difference between an electrical signal corresponding to an output light and an electrical signal corresponding to a received light.

In the drawing, Tx designates an electrical signal corresponding to an output light, and Rx designates an electrical signal corresponding to a received light.

The processor 170 may calculate distance information based on a phase difference $\Phi$ between an electrical signal corresponding to an output light and an electrical signal corresponding to a received light, and may sense a touch input or a gesture input based on the calculated distance information.

The light output module of FIG. 4 may output the first projection image 202a and the second projection image 202b on the first screen 200a and the second screen 200b respectively.

In this case, the first projection image 202a and the second projection image 202b may be different images. Various examples of operation of the scanner 140 will be described below with reference to FIGS. 6A to 6E.

FIGS. 6A to 6E are reference views for explanation of an operating method of the light output module of FIG. 4.

Figure 6A:
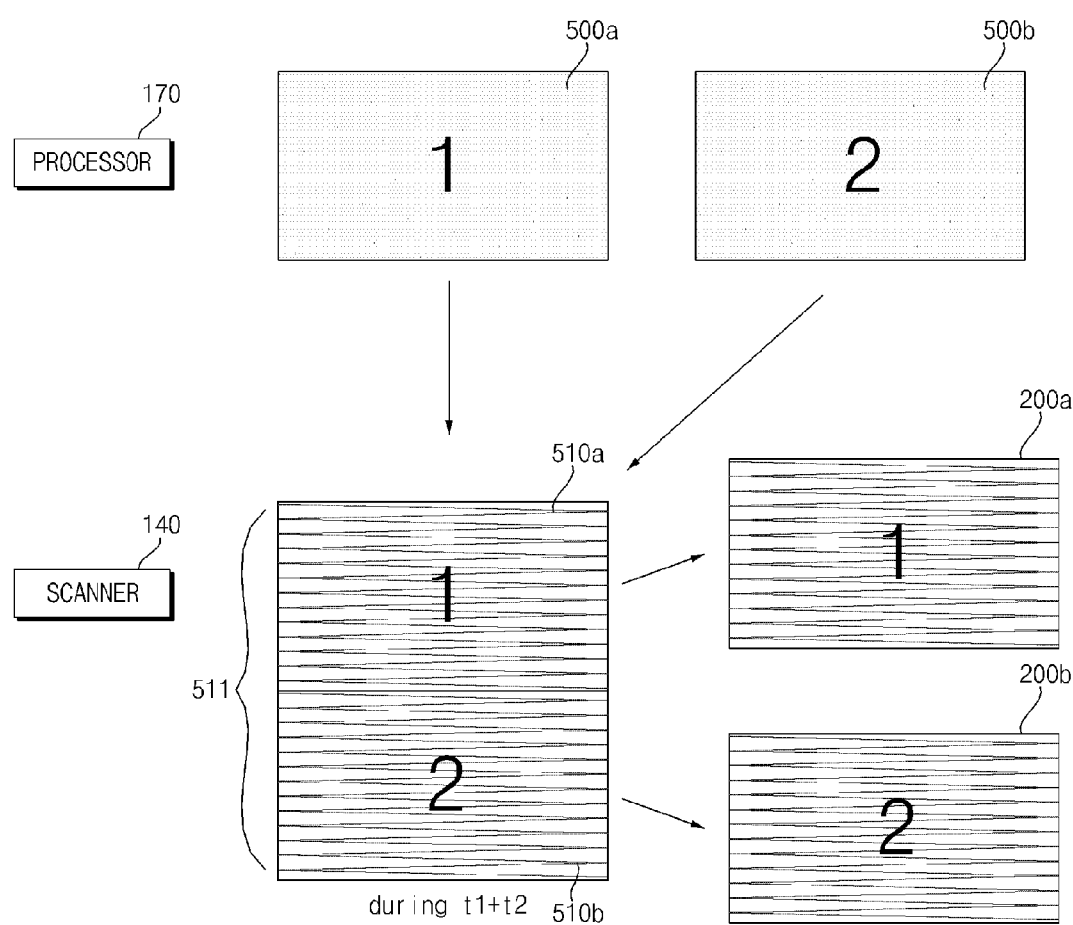
FIGS. 6A to 6E are reference views for explanation of an operating method of the light output module of FIG. 4.

FIG. 6A illustrates one example in which different images are respectively displayed on the first screen 200a and the second screen 200b.

As exemplarily shown in FIG. 6A, when the processor 170 alternately outputs a first image 500a to be displayed on the first screen 200a and a second image 500b to be displayed on the second screen 200b at a frame rate of 60 Hz, the scanner 140 may output a projection image 511 having increased spatial resolution, acquired via combination of a first projection image 510a and a second projection image 510b, at a frame rate of 30 Hz during a frame section t1+t2 using the received first image 500a and second image 500b.

Figure 6B:
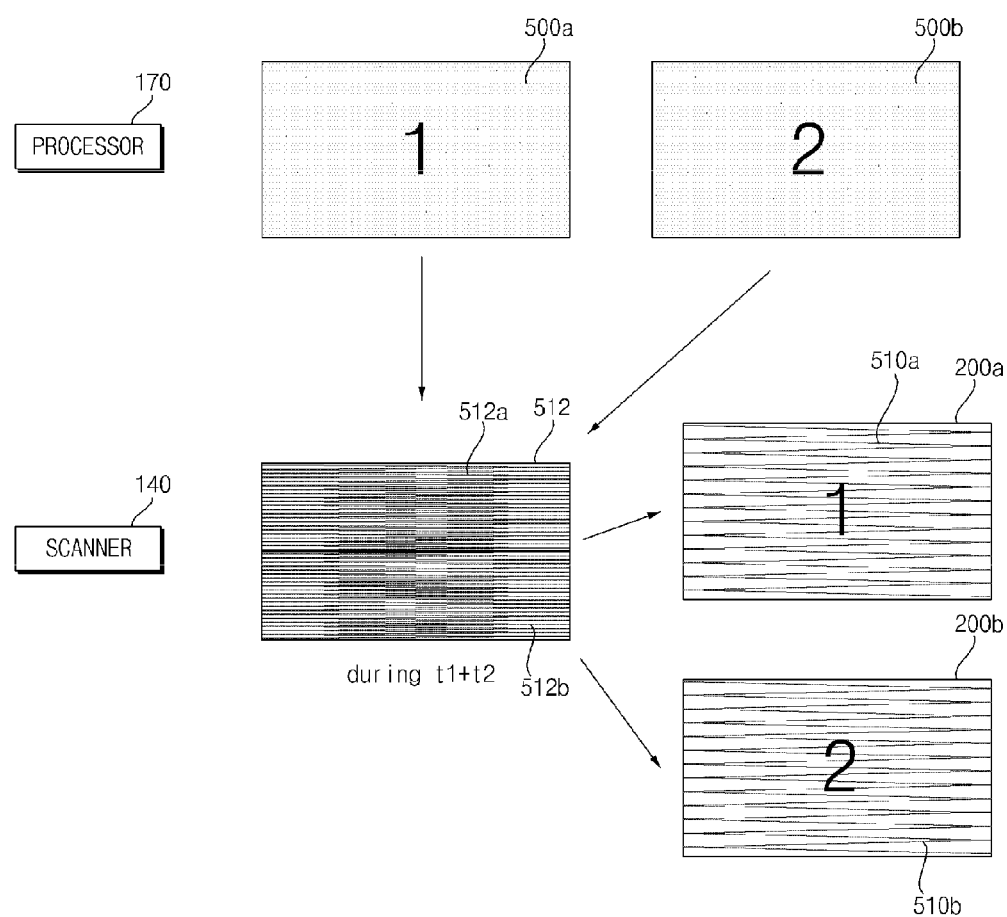
Figure 6C:
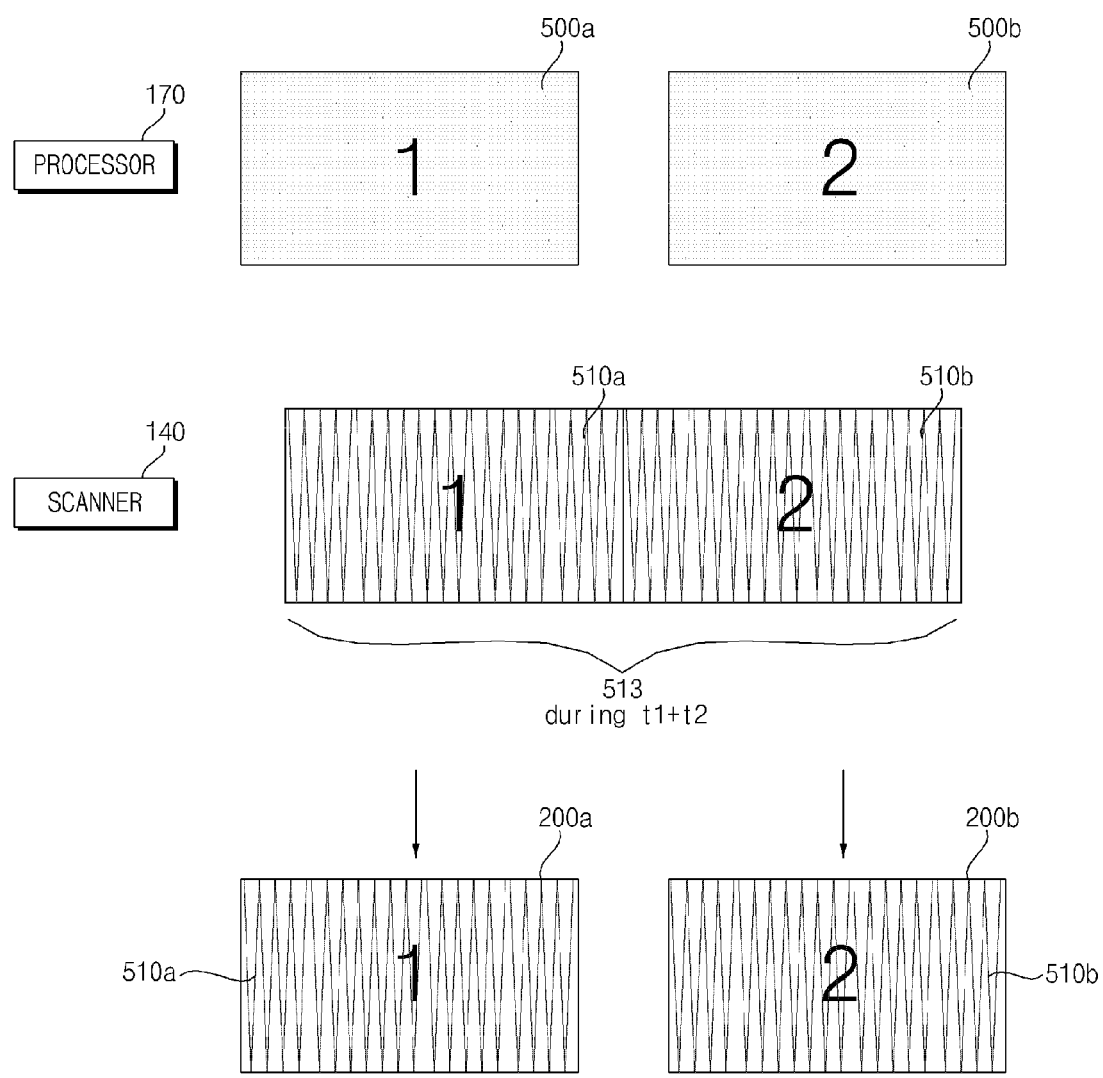
Figure 6D:
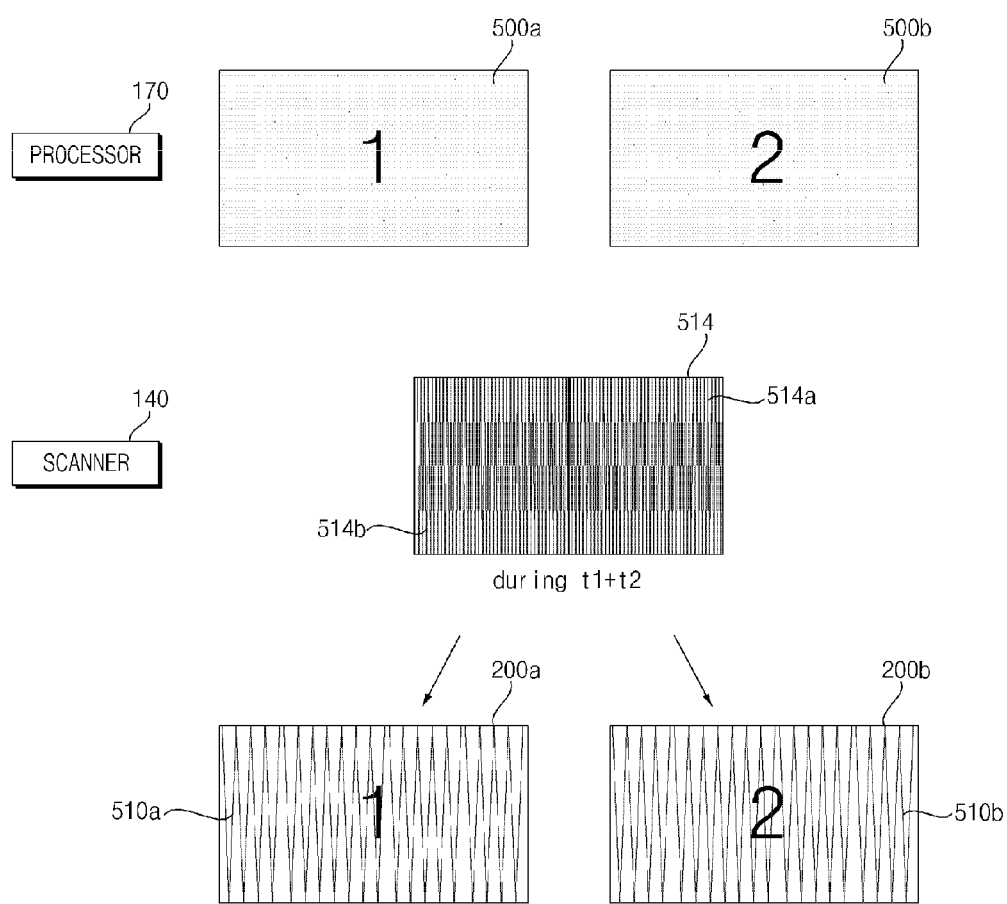
Figure 6E:
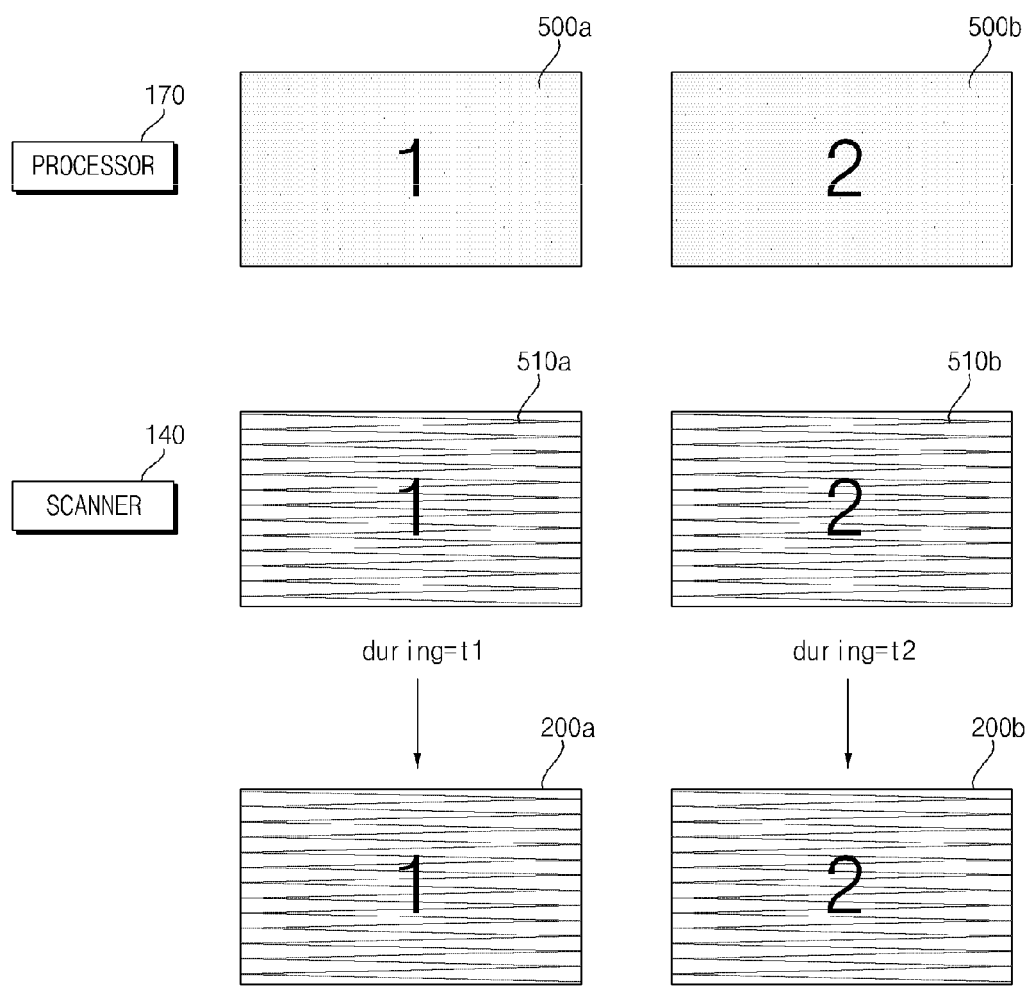

As compared to the scanner 140 of FIG. 6E, the scanner 140 of FIG. 6A has a difference in that a scan area is doubled. Such an increased scan area, as exemplarily shown in the drawing, is accomplished via reduction of a frame rate.

For example, when the 2D scanner 140 is subjected to horizontal resonance driving and vertical forced driving at a frame rate of the scanner 140 reduced from 60 Hz to 30 Hz and a vertical driving angle of the scanner 140 is set to be equal to that in FIG. 6E, a horizontal scan area is fixed, but a vertical scan area may be doubled.

In another example, the processor 170 may alternately output the first image 500a and the second image 500b at a frame rate of 120 Hz, and the scanner 140 may simultaneously output the first projection image 510a and the second projection image 510b at a frame rate of 60 Hz.

Meanwhile, the light path splitter 300 may output the first projection image 510a, corresponding to an upper area of the scan area, to the first screen 200a and the second projection image 510b, corresponding to a lower area of the scan area, to the second screen 200b during the frame section t1+t2.

Figure 8:
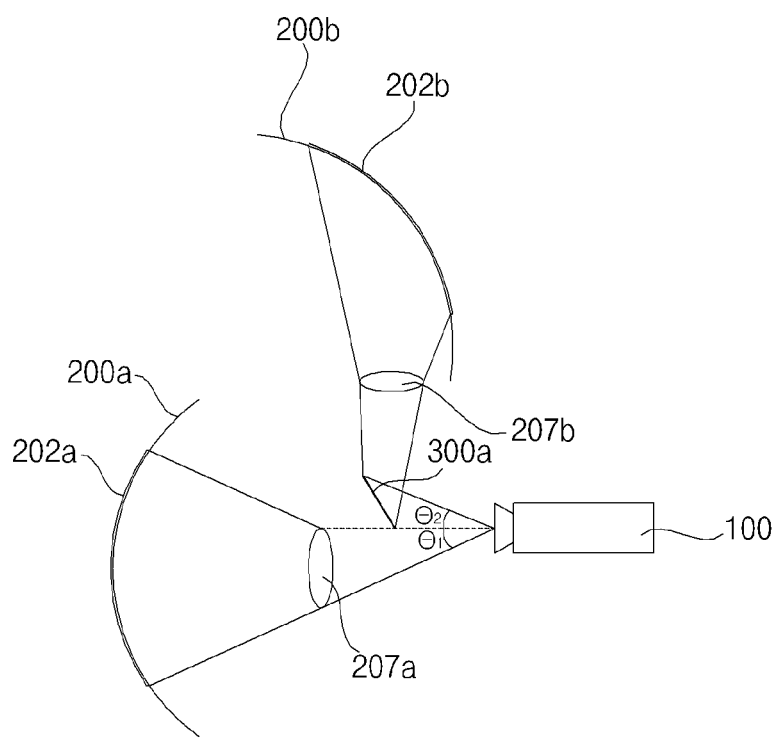
FIG. 8 illustrates one example of a light path splitter of FIG. 1.

To this end, the light path splitter 300 may split a light path based on an area of an input projection image as exemplarily shown in FIG. 8.

FIG. 8 illustrates the case in which a first area of an image output from the scanner 140 is directly transmitted to the first lens 207a without passing through a mirror 300a, thereby being output to the first screen 200a, and a second area of the image output from the scanner 140 is introduced into and reflected by the mirror 300a, thereby being output to the second screen 200b by way of the second lens 207b. In this case, the first area of the image output from the scanner 140, i.e. a first projection image may have a light path spaced apart from the mirror 300a. That is, the first projection image may not be introduced into the mirror 300a.

FIG. 6B illustrates another example in which different images are respectively displayed on the first screen 200a and the second screen 200b.

As exemplarily shown in FIG. 6B, the processor 170 may alternately output the first image 500a to be displayed on the first screen 200a and the second image 500b to be displayed on the second screen 200b at a frame rate of 60 Hz, and the scanner 140 may output a projection image 512 having increased spatial resolution, acquired via combination of a first projection image 512a and a second projection image 512b, at a frame rate of 30 Hz during the frame section t1+t2 using the received first image 500a and second image 500b.

Meanwhile, the scanner 140 of FIG. 6B exhibits a scan area half that of the scanner of FIG. 6A.

For example, when the 2D scanner 140 is subjected to horizontal resonance driving and vertical forced driving at a frame rate of the scanner 140 reduced from 60 Hz to 30 Hz and a vertical driving angle of the scanner 140 is set to half that in FIG. 6A, as exemplarily shown in the drawing, a vertical scan area is equal to that in FIG. 6E, but spatial resolution is twice that in FIG. 6E. That is, a scan area of the scanner of FIG. 6B is half that of the scanner 140 of FIG. 6A and spatial resolution is equal in both of FIG. 6A and FIG. 6B.

In another example, the processor 170 may alternately output the first image 500a and the second image 500b at a frame rate of 120 Hz, and the scanner 140 may simultaneously output the first projection image 512a and the second projection image 512b at a frame rate of 60 Hz.

Meanwhile, the light path splitter 300 may output the first projection image 510a, corresponding to an upper area of the scan area, to the first screen 200a and the second projection image 510b, corresponding to a lower area of the scan area, to the second screen 200b during the frame section t1+t2.

To this end, the light path splitter 300 may split a light path based on an area of an input projection image as exemplarily shown in FIG. 8.

Since the size of upper and lower areas of the first projection image and the second projection image output from the scanner 140 in FIG. 6B is half that in FIG. 6A, the magnification of the first lens 207a and the second lens 207b in FIG. 6B may be two times or more greater than that in FIG. 6A.

FIG. 6C corresponds to FIG. 6A, but adopts vertical scanning rather than horizontal scanning, differently from FIG. 6A.

The scanner 140 of FIG. 6C may output a projection image 513 having increased spatial resolution as the first projection image 510a and the second projection image 510b are arranged at left and right sides via vertical scanning.

More specifically, through use of the first image 500a and the second image 500b output from the processor 170 at a frame rate of 60 Hz, the scanner 140 may output the projection image 513 having increased spatial resolution, acquired via combination of the first projection image 510a and the second projection image 510b, at a frame rate of 30 Hz during the frame section t1+t2.

For example, when the 2D scanner 140 is subjected to horizontal forced driving and vertical resonance driving at a frame rate of the scanner 140 reduced from 60 Hz to 30 Hz and a horizontal driving angle of the scanner 140 is set to be equal to that in FIG. 6E, a vertical scan area is fixed, but a horizontal scan area may be doubled.

In another example, the processor 170 may alternately output the first image 500a and the second image 500b at a frame rate of 120 Hz, and the scanner 140 may output the projection image 513 having increased spatial resolution, acquired via combination of the first projection image 510a and the second projection image 510b, at a frame rate of 60 Hz.

Meanwhile, the light path splitter 300 may output the first projection image 510a, corresponding to a left area of the scan area, to the first screen 200a and the second projection image 510b, corresponding to a right area of the scan area, to the second screen 200b during the frame section t1+t2.

To this end, the light path splitter 300 may split a light path based on an area of an input projection image as exemplarily shown in FIG. 8.

FIG. 6D corresponds to FIG. 6B, but has a difference in that vertical scanning rather than horizontal scanning is implemented.

As exemplarily shown in FIG. 6D, the processor 170 may alternately output the first image 500a to be displayed on the first screen 200a and the second image 500b to be displayed on the second screen 200b at a frame rate of 60 Hz, and the scanner 140 may output a projection image 514 having increased spatial resolution, acquired via combination of a first projection image 514a and a second projection image 514b, at a frame rate of 30 Hz during the frame section t1+t2 using the received first image 500a and second image 500b.

The scanner 140 of FIG. 6D exhibits a scan area half that of the scanner of FIG. 6C.

For example, when the 2D scanner 140 is subjected to horizontal forced driving and vertical resonance driving at a frame rate of the scanner 140 reduced from 60 Hz to 30 Hz and a horizontal driving angle of the scanner 140 is set to half that in FIG. 6C, as exemplarily shown in the drawing, a horizontal scan area is equal to that of the scanner 140 of FIG. 6E, but spatial resolution is doubled. That is, a scan area of the scanner 140 of FIG. 6D is half that of the scanner of FIG. 6C and spatial resolution is equal in both of FIG. 6C and FIG. 6D.

In another example, the processor 170 may alternately output the first image 500a and the second image 500b at a frame rate of 120 Hz, and the scanner 140 may simultaneously output the first projection image 514a and the second projection image 514b at a frame rate of 60 Hz.

The light path splitter 300 may output the first projection image 514a, corresponding to a left area of the scan area, to the first screen 200a and the second projection image 514b, corresponding to a right area of the scan area, to the second screen 200b during the frame section t1+t2.

To this end, the light path splitter 300 may split a light path based on an area of an input projection image as exemplarily shown in FIG. 8.

Since the size of left and right areas of the first projection image and the second projection image output from the scanner 140 in FIG. 6D is half that in FIG. 6C, the magnification of the first lens 207a and the second lens 207b in FIG. 6D may be two times or more greater than that in FIG. 6C.

Next, FIG. 6E illustrates a further example in which different images are displayed respectively on the first screen 200a and the second screen 200b.

As illustrated in FIG. 6E, as the processor 170 outputs the first image 500a during a first frame section t1 and the second image 500b during a second frame section t2, the scanner 140 scans the first projection image 510a during the first frame section t1 and the second projection image 510b during the second frame section t2 at the same frame rate, thereby outputting the first projection image 510a to the first screen 200a and the second projection image 510b to the second screen 200b.

More specifically, FIG. 6E illustrates the example in which the processor 170 controls display of different images on corresponding screens and output of the images on a per frame basis.

For example, the processor 170 may alternately output the first image 500a to be displayed on the first screen 200a and the second image 500b to be displayed on the second screen 200b at a frame rate of 60 Hz, and the scanner 140 may alternately output the first projection image 510a and the second projection image 510b at a frame rate of 60 Hz.

In another example, the processor 170 and the scanner 140 may alternately output the first image 500a and the second image 500b at a frame rate of 120 Hz.

The light path splitter 300 may output the first projection image 510a, output from the light output module 100, to the first screen 200a during the first frame section t1 and may output the second projection image 510b, output from the light output module 100, to the second screen 200b during the frame section t2.

To this end, the light path splitter 300 of FIG. 1 may include transparent electrodes and a liquid crystal layer to vary an index of refraction.

More specifically, as the liquid crystal layer has an arrangement to transmit light during the first frame section t1, the light path splitter 300 may directly transmit the first image 500a, output from the light output module 100, to the first screen 200a. In addition, as the liquid crystal layer has an arrangement to reflect light during the second frame section t2, the light path splitter 300 may reflect the second image 500b, output from the light output module 100, to the second screen 200b.

Figure 7:
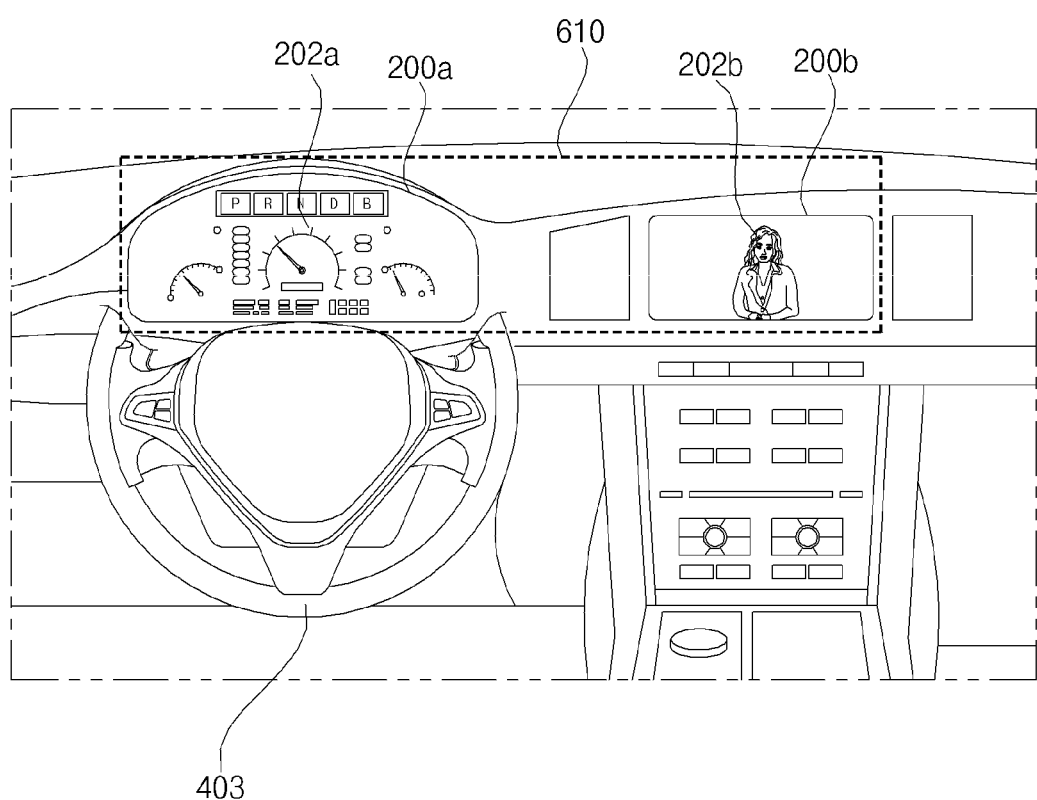
FIG. 7 illustrates an implementation example of the display apparatus of FIG. 1.

FIG. 7 illustrates an implementation example of the display apparatus of FIG. 1.

Referring to the drawing, the display apparatus 10 of the present invention is designed to display images on a plurality of screens. Thus, the display apparatus 10 may be embodied as a multi-display apparatus for use in public places, such as theaters, terminals, airports, etc. Alternatively, the display apparatus 10 may be embodied as a multi-display apparatus for use in a specific private space, such as a living room or a bedroom. Alternatively, the display apparatus 10 may be embodied as a multi-display apparatus for use in a specific private space, such as the interior of a vehicle.

FIG. 7 illustrates an implementation example in which the display apparatus in accordance with the embodiment of the present invention is installed to a center fascia 610 of a vehicle having a freeform curved surface.

The center fascia 610 may be provided, at the front of a steering wheel 403, with the first screen 200a corresponding to a dashboard where various gauges are arranged, and the second screen 200b corresponding to a display region where, e.g., a broadcast image is displayed.

The drawing illustrates the case in which a gauge image as the first projection image 202a is displayed on the first screen 200a and a broadcast image as the second projection image 202b is displayed on the second screen 200b.

Thereby, a driver may view the first projection image 202a displayed on the first screen 200a, and a passenger who sits in a passenger seat next to a driver seat may view the second projection image 202b displayed on the second screen 200b.

FIG. 8 illustrates one example of the light path splitter of FIG. 1.

Referring to FIG. 8, a light path splitter 300a of FIG. 8 is one example of the light path splitter 300 of FIG. 1 and takes the form of a mirror to reflect incident light.

More specifically, a first portion of light, output from the light output module 100, may be introduced into the first lens 207a without passing through the mirror 300a, and a second portion of the light output from the light output module 100 may be introduced into the mirror 300a.

In the drawing, for convenience, the first portion of the light output from the light output module 100 is illustrated as having a first angular range $\theta_1$, and the second portion of the light output from the light output module 100 is illustrated as having a second angular range $\theta_2$.

According to the embodiment of the present invention, the scanner 140 included in the light output module 100 may function to adjust a scan area. Thus, based on a position of the mirror 300*a*, the first portion of light, output from the scanner 140 of the light output module 100, may not pass through the mirror 300*a*, and the second portion of light, output from the scanner 140 of the light output module 100, may be introduced into the mirror 300*a*.

Thereby, the first portion of light, output from the scanner 140, is expanded by the first lens 207*a* to thereby be output to the first screen 200*a*, and the second portion of light, output from the scanner 140, is reflected by the mirror 300*a* and expanded by the second lens 207*b* to thereby be output to the second screen 200*b*.

Meanwhile, when the first projection image 202*a* and the second projection image 202*b* are respectively displayed on the first screen 200*a* and the second screen 200*b*, the first portion of light, output from the scanner 140, may correspond to the first projection image 510*a*, corresponding to the upper scan area, output from the scanner 140 of FIG. 6A, the first projection image 512*a*, corresponding to the upper scan area, output from the scanner 140 of FIG. 6B, the first projection image 510*a*, corresponding to the left scan area, output from the scanner 140 of FIG. 6C, or the first projection image 514*a*, corresponding to the left scan area, output from the scanner 140 of FIG. 6D. In addition, the second portion of light, output from the scanner 140, may correspond to the second projection image 510*b*, corresponding to the lower scan area, output from the scanner 140 of FIG. 6A, the second projection image 512*b*, corresponding to the lower scan area, output from the scanner 140 of FIG. 6B, the second projection image 510*b*, corresponding to the right scan area, output from the scanner 140 of FIG. 6C, or the second projection image 514*b*, corresponding to the right scan area, output from the scanner 140 of FIG. 6D.

On the other hand, when the same image is displayed on the first screen 200*a* and the second screen 200*b*, the first portion of light, output from the scanner 140, may correspond to the first projection image 510*a*, corresponding to the upper scan area, output from the scanner 140 of FIG. 6A or the first projection image 512*a*, corresponding to the upper scan area, output from the scanner 140 of FIG. 6B. In addition, the second portion of light, output from the scanner 140, may correspond to the second projection image 510*b*, corresponding to the lower scan area, output from the scanner 140 of FIG. 6A or the second projection image 512*b*, corresponding to the lower scan area, output from the scanner 140 of FIG. 6B.

Differently from FIG. 8, the first portion of light output from the light output module 100 may be reflected by the mirror 300*a* to thereby be output to the first screen 200*a* by way of the first lens 207*a*, and the second portion of light output from the light output module 100 may be output to the second screen 200*b* by way of the second lens 207*b* without passing through the mirror 300*a*.

Figure 9:
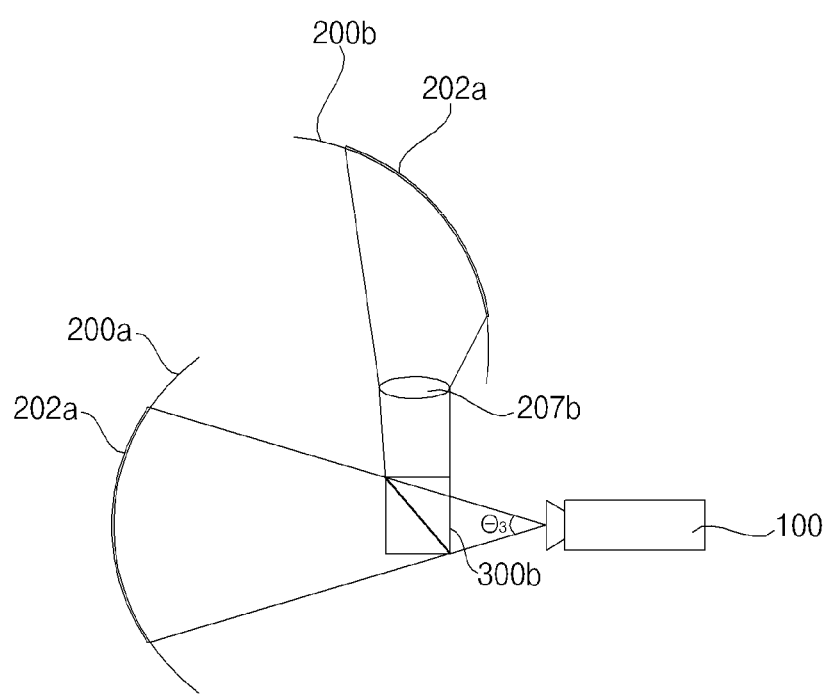
FIG. 9 illustrates another example of the light path splitter of FIG. 1.

FIG. 9 illustrates another example of the light path splitter of FIG. 1.

Referring to the drawing, a light path splitter 300*b* of FIG. 9 is another example of the light path splitter 300 of FIG. 1, and takes the form of a polarized beam splitter (PBS) that transmits a first polarized light and reflects a second polarized light.

More specifically, all lights output from the light output module 100 are introduced into the polarized beam splitter 300*b*, and the polarized beam splitter 300*b* may transmit a first polarized light among the lights output from the light output module 100 so as to output the same to the first screen 200*a* by way of the first lens 207*a*, and may reflect a second polarized light among the lights output from the light output module 100 so as to output the same to the second screen 200*b* by way of the second lens 207*b*.

As exemplarily shown in FIG. 9, when the light path splitter takes the form of the polarized beam splitter 300*b*, the light output module 100 may output first polarized and second polarized visible light and output lights. This light output module will be described below with reference to FIGS. 10 and 11.

Figure 10:
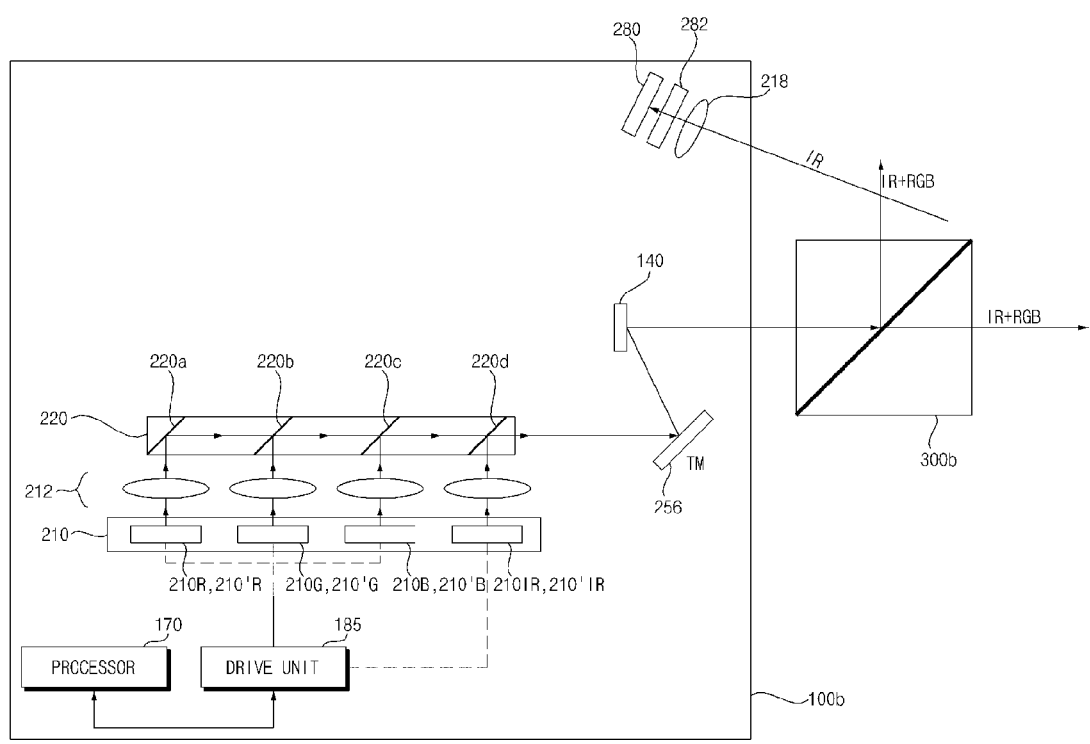
FIG. 10 illustrates one example of a light output module corresponding to the light path splitter of FIG. 9.

FIG. 10 illustrates one example of a light output module corresponding to the light path splitter of FIG. 9.

A light output module 100*b* of FIG. 10 is similar to the light output module 100*a* of FIG. 4, and thus only differences therebetween will be described below.

The light source unit 210 in the light output module 100*b* of FIG. 10 may include P-polarized light sources 210R, 210G, 210B and 210IR and S-polarized light sources 210'R, 210'G, 210'B and 210'IR.

To display a first projection image on the first screen 200*a*, the P-polarized light sources 210R, 210G, 210B and 210IR may output corresponding lights. To display a second projection image on the second screen 200*b*, the S-polarized light sources 210'R, 210'G, 210'B and 210'IR may output corresponding lights.

P-polarized visible light and output lights and S-polarized visible light and output lights may be transmitted to the scanner 140 by way of the photosynthesis unit 220 and the light reflector 256, and the scanner 140 may output the P-polarized visible light and output lights and the S-polarized visible light and output lights.

In this case, the P-polarized visible light and output lights and the S-polarized visible light and output lights, output from the scanner 140, may be simultaneously output.

In this case, the P-polarized visible light and output lights may be transmitted through the polarized beam splitter 300*b* to thereby be transmitted to the first screen 200*a*, and the S-polarized visible light and output lights may be reflected by the polarized beam splitter 300*b* to thereby be transmitted to the second screen 200*b*. That is, a first projection image based on a P-polarized light is transmitted through the polarized beam splitter 300*b* to thereby be displayed on the first screen 200*a*, and a second projection image based on an S-polarized light is reflected by the polarized beam splitter 300*b* to thereby be displayed on the second screen 200*b*.

Simultaneous output of the first projection image based on the P-polarized light and the second projection image based on the S-polarized light from the scanner 140 may correspond to the case in which the P-polarized light sources 210R, 210G, 210B and 210IR and the S-polarized light sources 210'R, 210'G, 210'B and 210'IR simultaneously output visible lights and output lights such that a first projection image and a second projection image are output to overlap each other, or the case in which the processor 170 alternately outputs the first projection image and the second projection image at a frame rate of 60 Hz and the scanner 140 outputs the first projection image and the second projection image during a frame section at a frame rate of 30 Hz as exemplarily shown in FIG. 6A. This may be equally applied to the cases of FIG. 6B to 6D.

As exemplarily shown in FIGS. 6A to 6D, when a P-polarized light corresponding to the first projection image and a S-polarized light corresponding to the second projection image are separated from each other, in addition to the polarized beam splitter 300b of FIG. 9, the mirror 300a of FIG. 8 may be used.

The P-polarized visible light and output lights and the S-polarized visible light and output lights, output from the scanner 140, may be sequentially output.

Meanwhile, output of a first projection image based on a P-polarized light and a second projection image based on an S-polarized light from the scanner 140, as exemplarily shown in FIG. 6E, may correspond to the case in which the scanner 140 scans the first projection image 510a during the first frame section t1 to output the same to the first screen 200a, and scans the second projection image 510b during the second frame section t2 to output the same to the second screen 200b.

A received light, acquired after scattering or reflection of the output light, may be input to the light detector 280 by way of the collimator unit 218 and the infrared light transmission filter 282.

The light detector 280 may detect a received light from an external object, the received light corresponding to the output light, and convert the detected received light into an electrical signal.

Then, the processor 170 may sense the aforementioned touch input or gesture input based on an electrical signal corresponding to the output light and an electrical signal corresponding to the received light.

Figure 11:
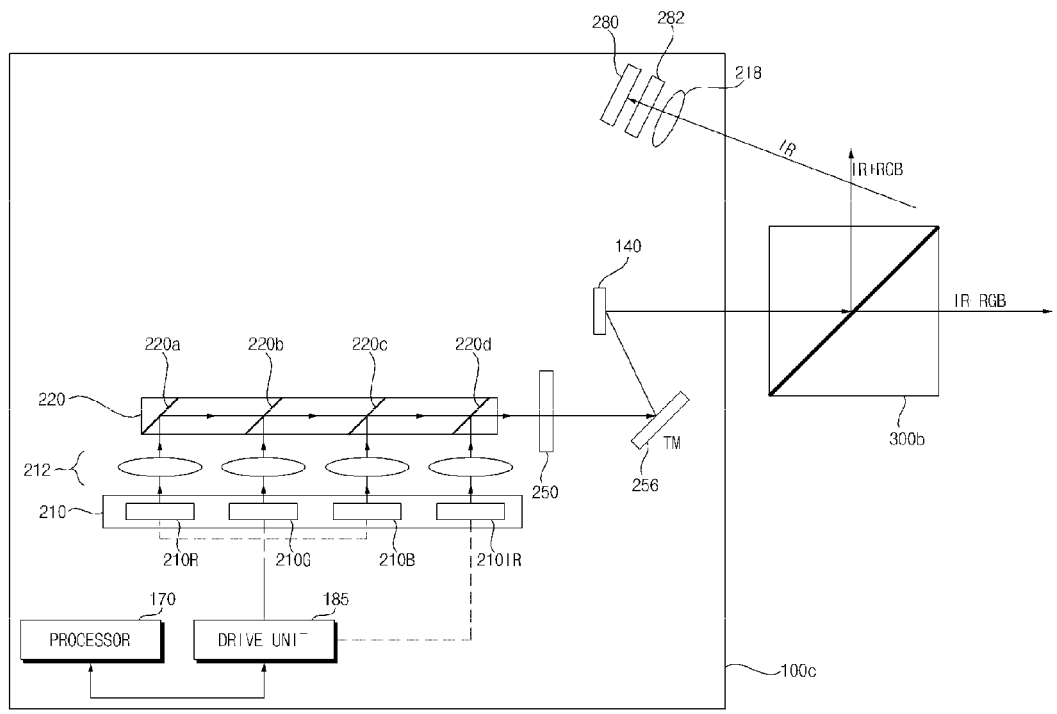
FIG. 11 illustrates another example of a light output module corresponding to the light path splitter of FIG. 9.

FIG. 11 illustrates another example of a light output module corresponding to the light path splitter of FIG. 9.

A light output module 100c of FIG. 11 is similar to the light output module 100a of FIG. 4, and thus only differences therebetween will be described below.

The light output module 100c of FIG. 11 may include the light source unit 210, the photosynthesis unit 220, the light reflector 256, and the scanner 140, which are identical to those of the light output module 100a of FIG. 4.

Differently, a polarized beam converter 250 may be provided between the photosynthesis unit 220 and the light reflector 256.

The polarized beam converter 250 may convert a polarization direction of a visible light and an output light. For example, the polarized beam converter 250 may control a polarization direction using a phase difference, and may convert linear polarization into circular polarization, or circular polarization into linear polarization.

For example, when the light source unit 210 outputs a P-polarized visible light and output light, the polarized beam converter 250 may selectively convert the P-polarized visible light and output light into a circularly polarized visible light and output light.

Then, the P-polarized visible light and output light may be transmitted through the polarized beam splitter 300b to thereby be transmitted to the first screen 200a, and the circularly polarized visible light and output light may be reflected by the polarized beam splitter 300b to thereby be transmitted to the second screen 200b.

That is, a first projection image based on a P-polarized light may be transmitted through the polarized beam splitter 300b to thereby be displayed on the first screen 200a, and a second projection image based on a circularly polarized light may be reflected by the polarized beam splitter 300b to thereby be displayed on the second screen 200b.

To this end, the polarized beam converter 250 may bypass a first projection image based on a P-polarized light output during a first frame section without polarization conversion, and the bypassed first projection image, output from the scanner 140 is transmitted through the polarized beam splitter 300b to thereby be displayed on the first screen 200a.

In addition, the polarized beam converter 250 may implement polarization conversion on a second projection image output based on a P-polarized light during a second frame section to convert the second projection image based on the P-polarized light into a second projection image based on a circularly polarized light. The converted second projection image based on the circularly polarized light, output from the scanner 140, may be transmitted through the polarized beam splitter 300b to thereby be displayed on the second screen 200b.

In this case, the different first projection image and second projection image, output from the light output module 100c of FIG. 11, may be sequentially output to the first screen 200a and the second screen 200b, but various other examples are also possible.

That is, the different first projection image and second projection image, output from the light output module 100c of FIG. 11, may be simultaneously output to the first screen 200a and the second screen 200b.

As exemplarily shown in FIG. 6A, when the polarized beam converter 250 outputs a first projection image based on a P-polarized light during a first frame section and a converted second projection image based on a circularly polarized light during a second frame section at a frame rate of 60 Hz, vertical spatial resolution may be doubled by implementing horizontal resonance driving and vertical forced driving of the 2D scanner 140 at a reduced frame rate of the scanner 140 from 60 Hz to 30 Hz and setting a vertical driving angle to be equal to that in FIG. 6E.

Then, when the first projection image and the second projection image, having increased vertical spatial resolution, are output to the polarized beam splitter 300b, the polarized beam splitter 300b may transmit the first projection image based on a P-polarized light and reflect the second projection image based on a circularly polarized light.

The above described operation of FIG. 6A may be similarly applied to the cases of FIGS. 6B to 6D.

Meanwhile, as exemplarily shown in FIGS. 6A to 6D, when a light corresponding to the first projection image based on a P-polarized light and a light corresponding to a second projection image based on a linearly polarized light are separated from each other, in addition to the polarized beam splitter 300b of FIG. 9, the mirror 300a of FIG. 8 may be used.

A received light, acquired after scattering or reflection of the output light, may be input to the light detector 280 by way of the collimator unit 218 and the infrared light transmission filter 282.

The light detector 280 may detect a received light from an external object, the received light corresponding to the output light, and convert the detected received light into an electrical signal.

Then, the processor 170 may sense the aforementioned touch input or gesture input based on an electrical signal corresponding to the output light and an electrical signal corresponding to the received light.

Figure 12:
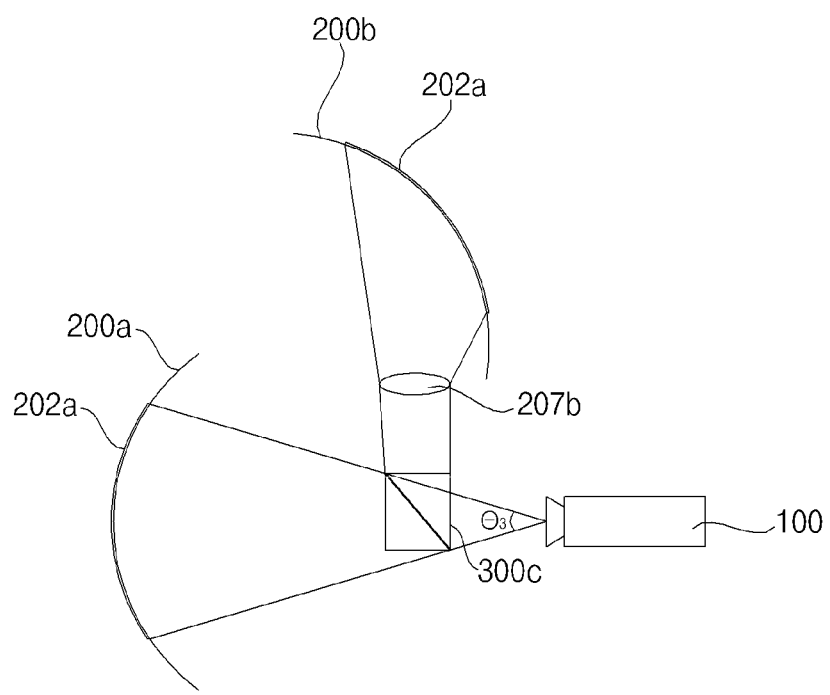
FIG. 12 illustrates a further example of the light path splitter of FIG. 1.

FIG. 12 illustrates a further example of the light path splitter of FIG. 1.

Referring to the drawing, a light path splitter 300c of FIG. 12 is a further example of the light path splitter 300 of FIG. 1, and takes the form of a light wavelength splitter 300c that transmits a light having a wavelength band of a first group 210G1, and reflects a light having a wavelength band of a second group 210G2.

More specifically, all lights output from the light output module 100 are introduced into the light wavelength splitter 300*c*, and the light wavelength splitter 300*c* may transmit a light having a wavelength band of the first group 210G1 among the lights output from the light output module 100 so as to output the same to the first screen 200*a* by way of the first lens 207*a*, and may reflect a light having a wavelength band of the second group 210G2 among the lights output from the light output module 100 so as to output the same to the second screen 200*b* by way of the second lens 207*b*.

As exemplarily shown in FIG. 12, when the light path splitter takes the form of the light wavelength splitter 300*c*, the light output module 100 may output a visible light and an output light corresponding to the wavelength bands of the first group 210G1 and the second group 201G2. This light output module will be described below with reference to FIG. 13.

A received light, acquired after scattering or reflection of the output light as described above, may be input to the light detector 280 through the collimator unit 218 and the infrared light transmission filter 282.

The light detector 280 may detect a received light from an external object, the received light corresponding to the output light, and convert the detected received light into an electrical signal.

Then, the processor 170 may sense the aforementioned touch input or gesture input based on an electrical signal corresponding to the output light and an electrical signal corresponding to the received light.

Figure 13:
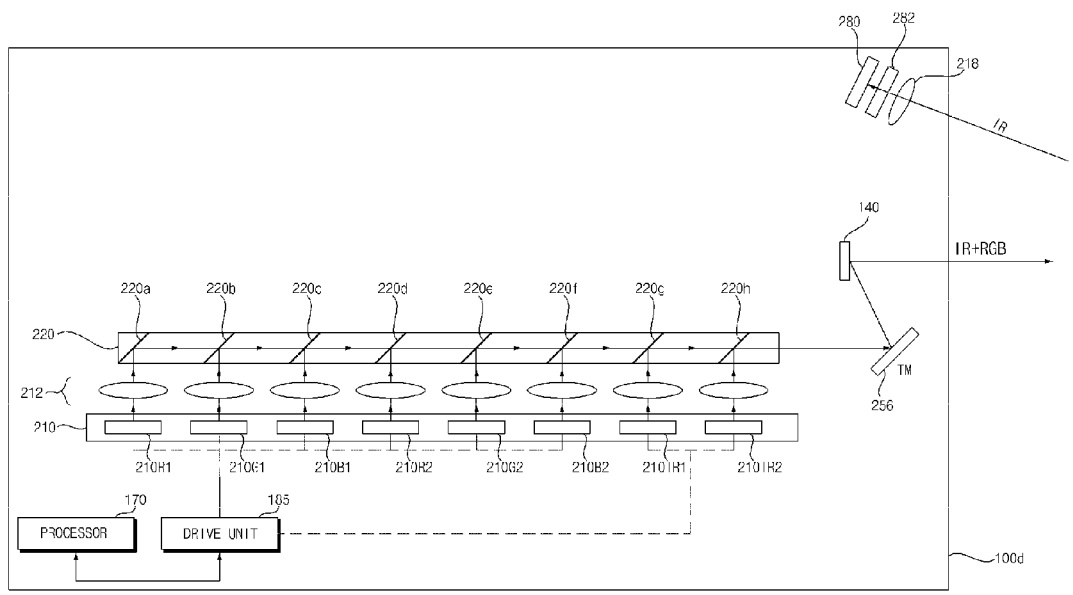
FIG. 13 illustrates one example of a light output module corresponding to the light path splitter of FIG. 12.
Figure 14:
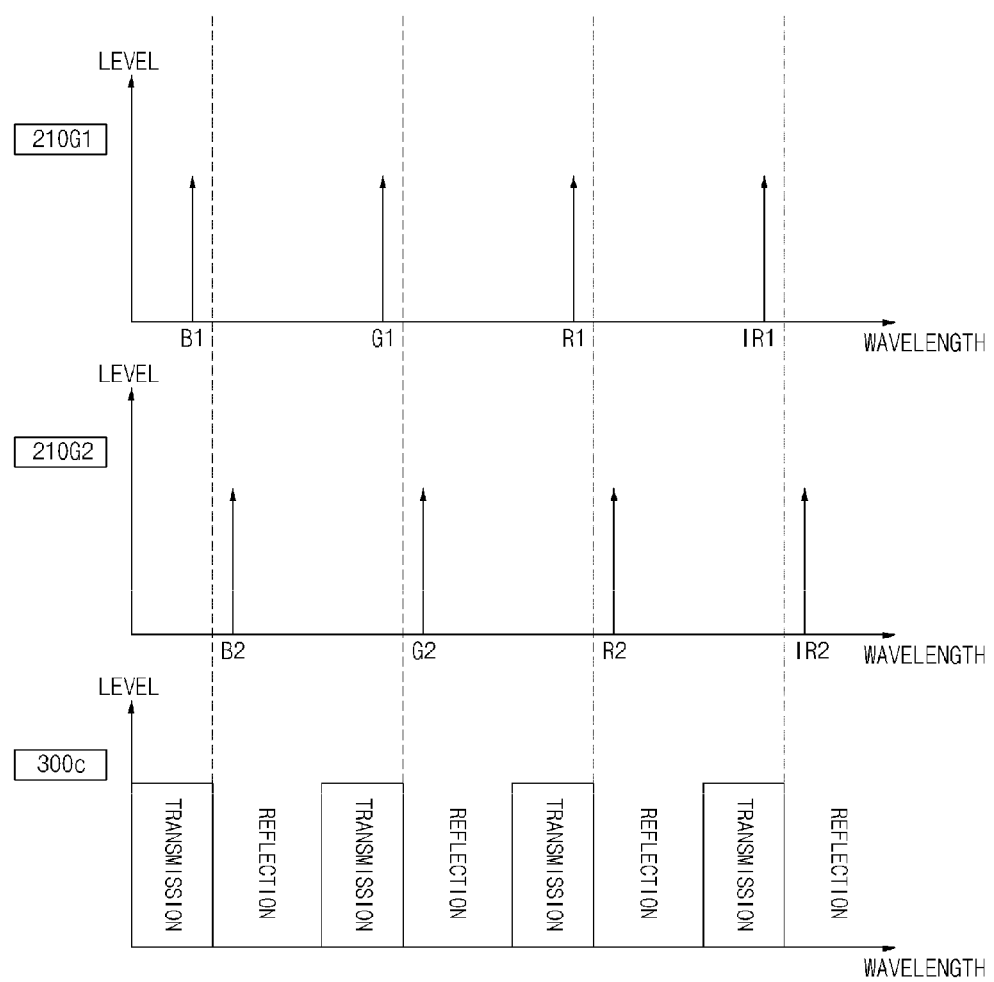
FIG. 14 is a reference view for explanation of an operating method of the light output module of FIG. 13.

FIG. 13 illustrates one example of a light output module corresponding to the light path splitter of FIG. 12, and FIG. 14 is a reference view for explanation of an operating method of the light output module of FIG. 13.

A light output module 100*d* of FIG. 13 is similar to the light output module 100*a* of FIG. 4, and thus only differences therebetween will be described below.

The light source unit 210 in the light output module 100*d* of FIG. 13 may include light sources 210R1, 210G1, 210B1 and 210IR1 of a first group 210G1 and light sources 210R2, 210G2, 210B2 and 210IR2 of a second group 210G2.

To display a first projection image on the first screen 200*a*, the respective light sources 210R1, 210G1, 210B1 and 210IR1 of the first group 210G1 may output corresponding lights. To display a second projection image on the second screen 200*b*, the respective light sources 210R2, 210G2, 210B2 and 210IR2 of the second group 210G2 may output corresponding lights.

As exemplarily shown in FIG. 14, wavelengths of the respective light sources 210R1, 210G1, 210B1 and 210IR1 of the first group 210G1 may be less than wavelengths of the respective light sources 210R2, 210G2, 210B2 and 210IR2 of the second group 210G2.

The light wavelength splitter 300*c* may transmit a light of a wavelength corresponding to the respective light sources 210R1, 210G1, 210B1 and 210IR1 of the first group 210G1 and reflect a light of a wavelength corresponding to the respective light sources 210R2, 210G2, 210B2 or 210IR2 of the second group 210G2.

A visible light and an output light of the first group 210G1 and a visible light and an output light of the second group 210G2 may be transmitted to the scanner 140 by way of the photosynthesis unit 220 and the light reflector 256, and the scanner 140 may output the visible light and output light of the first group 210G1 and the visible light and output light of the second group 210G2.

In this case, the visible light and output light of the first group 210G1 and the visible light and output light of the second group 210G2, output from the scanner 140, may be simultaneously output.

In this case, the visible light and output light of the first group 210G1 may be transmitted through the light wavelength splitter 300*c* to thereby be transmitted to the first screen 200*a*, and the visible light and output light of the second group 210G2 may be reflected by the light wavelength splitter 300*c* to thereby be transmitted to the second screen 200*b*. That is, a first projection image based on the visible light of the first group 210G1 may be transmitted through the light wavelength splitter 300*c* to thereby be displayed on the first screen 200*a*, and a second projection image based on the visible light of the second group 210G2 may be reflected by the light wavelength splitter 300*c* to thereby be displayed on the second screen 200*b*.

Meanwhile, simultaneous output of the first projection image and the second projection image from the scanner 140 may correspond to the case in which the respective light sources 210R1, 210G1, 210B1 and 210IR1 of the first group 210G1 and the respective light sources 210R2, 210G2, 210B2 and 210IR2 of the second group 210G2 simultaneously output visible lights and output lights, or the case in which the processor 170 sequentially outputs the first projection image and the second projection image at a frame rate of 60 Hz and the scanner 140 simultaneously outputs the first projection image and the second projection image at a frame rate of 30 Hz as exemplarily shown in FIG. 6A. This may be equally applied to the cases of FIGS. 6B to 6D.

As exemplarily shown in FIGS. 6A to 6D, when a light corresponding to the first projection image of the first group 210G1 and a light corresponding to the second projection image of the second group 210G2 are separated from each other, in addition to the light wavelength splitter 300*c* of FIG. 12, the mirror 300*a* of FIG. 8 may be used.

Meanwhile, output of the first projection image and the second projection image from the scanner 140 may correspond to the case in which the scanner 140 scans the first projection image 510*a* during the first frame section t1 to output the first projection image 510*a* to the first screen 200*a* and scans the second projection image 510*b* during the second frame section t2 to output the second projection image 510*b* to the second screen 200*b* as exemplarily shown in FIG. 6E.

Figure 15:
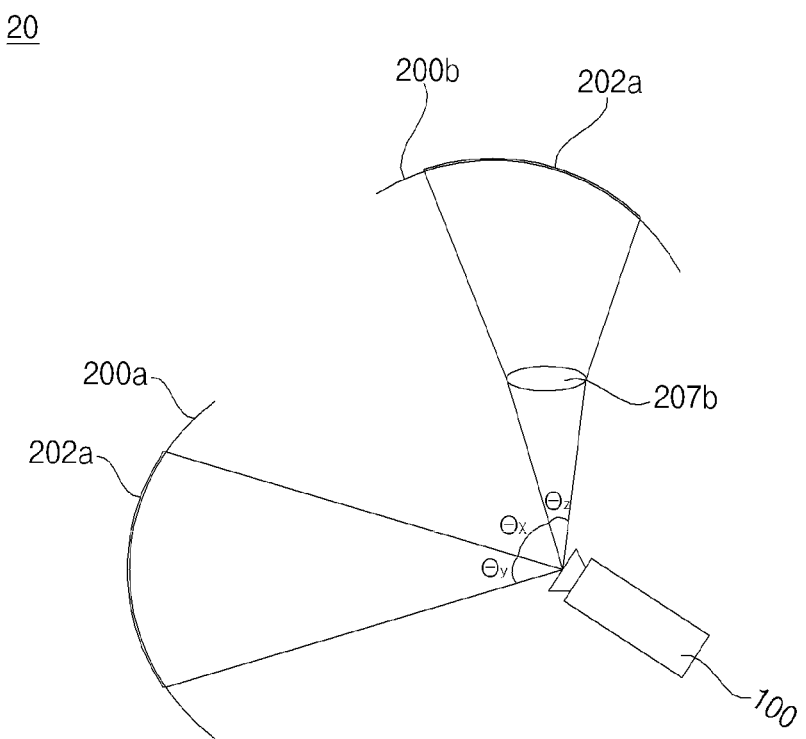
FIG. 15 illustrates a conceptual view of a display apparatus in accordance with a further embodiment of the present invention.

FIG. 15 illustrates a conceptual view of a display apparatus in accordance with a further embodiment of the present invention.

The display apparatus 20 of FIG. 15 may include the light output module 100 and the screens 200*a* and 200*b*, similar to the display apparatus 10 of FIG. 1. Although the drawing shows the display apparatus 20 as not including the light path splitter 300, the light path splitter 300 may be included. That is, the mirror 300*a* of FIG. 8, the polarized beam splitter 300*b* of FIG. 9, and the light wavelength splitter 300*c* of FIG. 12 may be used.

The light output module of FIG. 15 may be controlled to project first and second projection images onto the first and second screens 200*a* and 200*b* respectively, instead of the light path splitter 300. More specifically, the light output module 100 may split a light path via angle adjustment with respect to a scan area of the scanner 140 included in the light output module 100, for example. To this end, the light output module 100 of FIG. 15 may include a plurality of scanners.

The drawing illustrates the case in which a first projection image is output to a first area, a second projection image is output to a second area, and the first area and the second area are spaced apart from each other. In particular, the drawing illustrates a first angle $\theta_y$ corresponding to a first portion of light output from the light output module 100, a second angle $\theta_z$ corresponding to a second portion of the light, and a third angle $\theta_x$ corresponding to a gap between the first portion and the second portion.

Figure 16:
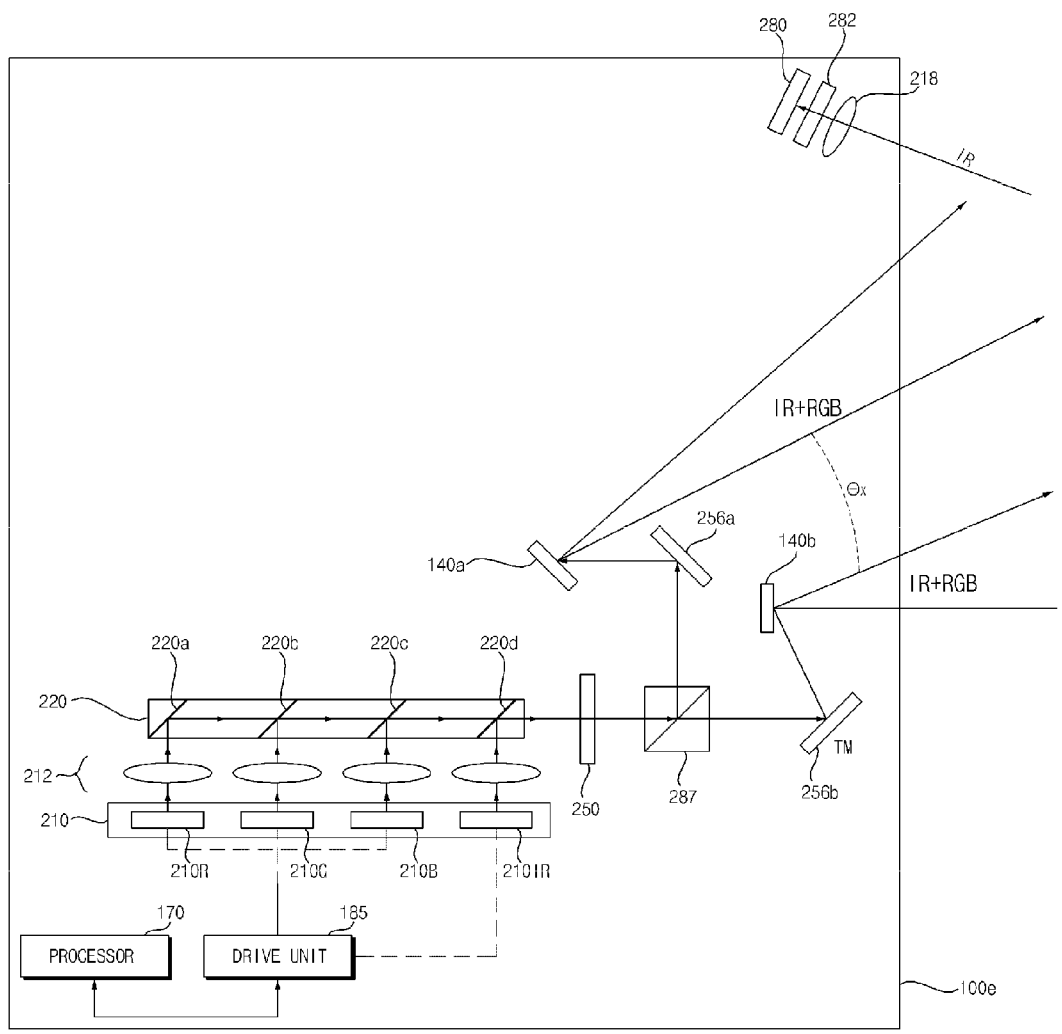
FIG. 16 illustrates one example of a light output module of FIG. 15.

FIG. 16 illustrates one example of the light output module of FIG. 15.

Referring to the drawing, a light output module 100e of FIG. 16 includes the light source unit 210 and the photosynthesis unit 220, similar to the light output module 100a of FIG. 4. In addition, the light output module 100e includes the collimator unit 218, the infrared light transmission filter 282, and the light detector 280, for light detection.

Differently from the light output module 100a of FIG. 4, the light output module 100e of FIG. 16 includes two light reflectors 256a and 256b, and two scanners 140a and 140b.

In addition, to separately display a first projection image and a second projection image, the light output module 100e of FIG. 16 may further include the polarized beam converter 250, and a polarized beam splitter 287. Thereby, a first projection image based on a first polarized light may be output to a first area by way of the first reflector 256a and the first scanner 140a, and a second projection image based on a second polarized light may be output to a second area by way of the second reflector 256b and the second scanner 140b.

Meanwhile, an angle between the first area and the second area may be adjusted by adjusting positions of the first and second scanners 140a and 140b or by adjusting scan areas.

The light output module 100e of FIG. 16 including the plural scanners 140a and 140b may be applied in the same manner as the above described light output modules 100a, 100b and 100d of FIGS. 4, 10 and 13.

In addition, the first projection image and the second projection image, output from the light output module 100e as exemplarily shown in FIGS. 6A to 6D, may be separated from each other based on a corresponding light portion thereof.

Meanwhile, a received light, acquired after scattering or reflection of the output light, may be input to the light detector 280 through the collimator unit 218 and the infrared light transmission filter 282.

The light detector 280 may detect a received light from the external object, the received light corresponding to the output light, and convert the detected received light into an electrical signal.

Then, the processor 170 may sense the aforementioned touch input or gesture input based on an electrical signal corresponding to the output light and an electrical signal corresponding to the received light.

Meanwhile, although the light output modules 100a, 100b, 100c and 100d of FIGS. 4, 10, 11 and 13 as described above are rear projection type light output modules, these light output modules may be applied to front projection, and any one of a first screen and a second screen may be a front projection type screen and the other one may be a rear projection type screen.

Meanwhile, the light output modules 100a, 100b, 100c and 100d of FIGS. 4, 10, 11 and 13 as described above are shown as including the collimator unit 218, the infrared light transmission filter 282, and the light detector 280 respectively, the collimator unit 218, the infrared light transmission filter 282, and the light detector 280 may be embodied into a light receiving module (not shown) independent of the light output modules 100a, 100b, 100c and 100d.

As is apparent from the above description, a display apparatus in accordance with an embodiment of the present invention may output a first projection image and a second projection image by driving a scanner in a light output module at a frame rate less than a frame rate of an input image, and may project the different images onto display areas by separating light paths of the first projection image and the second projection image from each other. In particular, the first projection image and the second projection image may be simultaneously output to the display areas.

The light output module may output green, blue, red lights and an output light for detection of a distance to an external object, which enables distance detection based on a user touch input or gesture input on the display areas.

Further, a display apparatus in accordance with another embodiment of the present invention may output a first projection image based on a first polarized light and a second projection image based on a second polarized light by driving a scanner in a light output module, and may project the different images onto display areas by separating light paths of the first projection image and the second projection image from each other.

In particular, a light path splitter enables projection of the different images onto the display areas by transmitting the first projection image based on the first polarized light and reflecting the second projection image based on the second polarized light. The first projection image and the second projection image may be simultaneously output to the display areas.

Furthermore, a display apparatus in accordance with another embodiment of the present invention may output a first projection image having a wavelength band of a first group and a second projection image having a wavelength band of a second group different from the wavelength band of the first group by driving a scanner in a light output module, and may project the different images onto display areas by separating light paths of the first projection image and the second projection image from each other.

In particular, a light path splitter enables projection of the different images onto the display areas by transmitting the first projection image and reflecting the second projection image based on a wavelength band thereof. The first projection image and the second projection image may be simultaneously output to the display areas.

The above described configurations and methods of the display apparatus are included in at least one of the embodiments of the present invention, and should not be limited to only one embodiment. In addition, the configurations and methods as illustrated in each embodiment may be implemented with regard to other embodiments as they are combined with one another or modified by those skilled in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus comprising:
   a light source configured to output visible light;
   a scanner positioned relative to the light source to receive the visible light, wherein the scanner is configured to output a first projection image and a second projection image based on the received visible light using respective first direction scanning and second direction scanning; and a light path splitter positioned relative to the scanner to receive the first projection image and the second projection image, wherein the light path splitter is configured to separate respective light paths of the first projection image and the second projection image from each other and output the first projection image toward a first display area and output the second projection image toward a second display area, wherein the visible light received by the scanner comprises first polarized visible light and second polarized visible light, and wherein the scanner is configured to output the first projection image based on the first polarized visible light, and output the second projection image based on the second polarized visible light, using the first direction scanning and the second direction scanning, and wherein the light path splitter includes a polarized beam splitter to output the first projection image toward the first display area, and to output the second projection image toward the second display area.

2. The apparatus according to claim 1, wherein the scanner outputs the first projection image and the second projection image during one frame section.

3. The apparatus according to claim 1, wherein the scanner varies an operating frame rate to increase spatial resolution of a scan area to which the first projection image and the second projection image are output, and wherein the light path splitter outputs the first projection image and the second projection image, each of which has a relative increase in spatial resolution, toward the first display area and the second display area respectively.

4. The apparatus according to claim 3, wherein the scanner varies at least one of vertical scanning speed, horizontal scanning speed, vertical angle, or horizontal angle to provide the increase in the spatial resolution of the scan area.

5. The apparatus according to claim 1, wherein the light source further outputs an output light to permit detection of a distance to an external object, and wherein the scanner outputs the first projection image, the second projection image, and the output light using the first direction scanning and the second direction scanning.

6. The apparatus according to claim 5, further comprising:
a light detector configured to detect received light; and
a processor configured to detect a distance from the apparatus to an external object, or motion of the external object relative to the apparatus, based upon the visible light output by the light source and the received light detected by the light detector.

7. The apparatus according to claim 1, wherein the scanner includes a first scanner and a second scanner, wherein the first scanner outputs the first projection image using the first direction scanning and the second direction scanning, and wherein the second scanner outputs the second projection image using the first direction scanning and the second direction scanning.

8. The apparatus according to claim 1, wherein the scanner outputs the first projection image and the second projection image during one frame section.

9. The apparatus according to claim 1, wherein the first polarized visible light comprises first polarized green, red, and blue lights, and the second polarized visible light comprises second polarized green, red, and blue lights.

10. The apparatus according to claim 9, wherein the light source outputs the first polarized visible light comprising the first polarized green, red, and blue lights, and wherein the apparatus further comprises:
a polarized beam converter positioned relative to the light source to receive and convert the first polarized green, red, and blue lights into the second polarized green, red, and blue lights, and to output the second projection image based on the second polarized light, and wherein the polarized beam splitter transmits the first projection image based on the first polarized light, and reflects the second projection image based on the second polarized light.

11. An apparatus comprising:
a light source configured to output visible light;
a scanner positioned relative to the light source to receive the visible light, wherein the scanner is configured to output a first projection image and a second projection image based on the received visible light using respective first direction scanning and second direction scanning; and
a light path splitter positioned relative to the scanner to receive the first projection image and the second projection image, wherein the light path splitter is configured to separate respective light paths of the first projection image and the second projection image from each other and output the first projection image toward a first display area and output the second projection image toward a second display area, wherein the scanner receives the visible light comprising first visible light and a second visible light at a first frame rate, and outputs the first projection image and the second projection image at a second frame rate less than the first frame rate.

12. The apparatus according to claim 11, wherein the scanner outputs the first projection image and the second projection image separately, and wherein the light path splitter includes a mirror configured to reflect any one of the first projection image or the second projection image.

13. The apparatus according to claim 12, wherein the other one of the first projection image or the second projection image output from the scanner has a light path spaced apart from the mirror.

14. The apparatus according to claim 11, wherein the light source further outputs an output light for detection of a distance to an external object, and wherein the scanner outputs the first projection image, the second projection image, and the output light, using the first direction scanning and the second direction scanning.

15. The apparatus according to claim 11, wherein the light source outputs the visible light comprising first visible light having a wavelength band of a first group and second visible light having a wavelength band of a second group, wherein the scanner outputs a first projection image based on the first visible light having the wavelength band of the first group and the second projection image based on the second visible light having the wavelength band of the second group using the first direction scanning and the second direction scanning, and wherein the light path splitter includes a light wavelength splitter to output the first projection image having the wavelength band of the first group toward the first display area and to output the second projection image having the wavelength band of the second group toward the second display area.

16. The apparatus according to claim 15, wherein the light source outputs the first visible light comprising green, blue, and red lights having the wavelength band of the first group and outputs the second visible light comprising green, blue, and red lights having the wavelength band of the second group, and wherein the light wavelength splitter transmits the first projection image based on the wavelength band of the first group, and reflects the second projection image based on the wavelength band of the second group.

17. The apparatus according to claim 15, wherein the light source further outputs an output light for detection of a distance to an external object, and wherein the scanner outputs the first projection image, the second projection image, and the output light, using the first direction scanning and the second direction scanning.

\* \* \* \* \*